United States Patent
Yang et al.

(10) Patent No.: US 10,237,768 B2
(45) Date of Patent: Mar. 19, 2019

(54) METHOD OF MEASURING SMALL CELL AND USER EQUIPMENT

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 15/520,635

(22) PCT Filed: Nov. 5, 2015

(86) PCT No.: PCT/KR2015/011851
§ 371 (c)(1),
(2) Date: Apr. 20, 2017

(87) PCT Pub. No.: WO2016/072765
PCT Pub. Date: May 12, 2016

(65) Prior Publication Data
US 2017/0318490 A1 Nov. 2, 2017

Related U.S. Application Data

(60) Provisional application No. 62/075,905, filed on Nov. 6, 2014.

(51) Int. Cl.
*H04W 24/08* (2009.01)
*H04J 11/00* (2006.01)
(Continued)

(52) U.S. Cl.
CPC ............ *H04W 24/08* (2013.01); *H04J 11/00* (2013.01); *H04L 5/0048* (2013.01);
(Continued)

(58) Field of Classification Search
CPC ...... H04W 24/08; H04W 16/32; H04W 8/005
See application file for complete search history.

(56) References Cited

U.S. PATENT DOCUMENTS

9,838,906 B2 * 12/2017 Yang .................. H04W 28/048
2012/0122472 A1 * 5/2012 Krishnamurthy ..... H04L 5/0053
455/456.1
(Continued)

FOREIGN PATENT DOCUMENTS

WO WO 2014/003457 A1 1/2014

OTHER PUBLICATIONS

Huawei et al., "Discussion on further clarifications on small cell on/off and discovery signal", R1-142974, 3GPP TSG RAN WG1 Meeting #78, Dresden, Germany, Aug. 18-22, 2014, See pp. 2-3.
(Continued)

*Primary Examiner* — Parth Patel
(74) *Attorney, Agent, or Firm* — Birch, Stewart, Kolasch & Birch, LLP

(57) ABSTRACT

A disclosure of the present specification provides a method of measuring a neighboring small cell. The method may include the steps of: receiving measurement configuration information from a serving cell; and measuring on the serving cell, the neighboring small cell, and a neighboring macro cell. The measurement configuration information may include one or more of a discovery signal measurement timing configuration (DMTC) and a measurement gap (MG) for the neighboring small cell. In addition, the DMTC may include DMTC periodicity information and information on the occasion section of a discovery signal. When a frequency band in which the serving cell operates, a frequency band in which the neighboring small cell operates, and a frequency band in which the neighboring macro cell operates are all the same, a measurement on the neighboring small cell may be performed for the time section by the DMTC and a mea-
(Continued)

surement on the serving cell may be performed for sections other than the time section by the DMTC.

14 Claims, 23 Drawing Sheets

(51) Int. Cl.
| | |
|---|---|
| H04L 5/00 | (2006.01) |
| H04L 7/00 | (2006.01) |
| H04L 12/24 | (2006.01) |
| H04W 8/00 | (2009.01) |
| H04W 16/32 | (2009.01) |
| H04W 36/00 | (2009.01) |
| H04W 56/00 | (2009.01) |
| H04W 48/12 | (2009.01) |
| H04W 84/04 | (2009.01) |
| H04L 5/14 | (2006.01) |

(52) U.S. Cl.
CPC .......... *H04L 5/0051* (2013.01); *H04L 7/0008* (2013.01); *H04L 41/08* (2013.01); *H04W 8/005* (2013.01); *H04W 16/32* (2013.01); *H04W 36/0088* (2013.01); *H04W 56/00* (2013.01); *H04L 5/1469* (2013.01); *H04W 36/0094* (2013.01); *H04W 48/12* (2013.01); *H04W 84/045* (2013.01)

(56) References Cited

U.S. PATENT DOCUMENTS

| | | | |
|---|---|---|---|
| 2012/0213109 A1* | 8/2012 | Xu | H04B 7/024 370/252 |
| 2013/0040640 A1* | 2/2013 | Chen | H04W 36/0083 455/434 |
| 2013/0301445 A1* | 11/2013 | Abe | H04L 5/0007 370/252 |
| 2015/0023191 A1* | 1/2015 | Kim | H04W 56/0015 370/252 |
| 2015/0131749 A1* | 5/2015 | Slomina | H04J 11/005 375/260 |
| 2015/0195763 A1* | 7/2015 | Chen | H04W 36/18 455/436 |
| 2015/0215847 A1* | 7/2015 | Yie | H04W 48/08 455/434 |
| 2015/0215856 A1* | 7/2015 | Kim | H04W 48/16 370/252 |
| 2016/0073366 A1* | 3/2016 | Ng | H04W 56/001 370/329 |
| 2016/0088500 A1* | 3/2016 | Chen | H04W 24/08 370/280 |
| 2016/0094374 A1* | 3/2016 | Koorapaty | H04L 27/262 370/329 |
| 2016/0183173 A1* | 6/2016 | Harada | H04W 48/12 455/434 |
| 2016/0242083 A1* | 8/2016 | Guan | H04W 24/08 |
| 2016/0262000 A1* | 9/2016 | Koorapaty | H04W 48/12 |
| 2017/0048918 A1* | 2/2017 | Iwamura | H04W 52/0206 |
| 2017/0085326 A1* | 3/2017 | Li | H04B 17/345 |
| 2017/0181067 A1* | 6/2017 | Schier | H04W 48/16 |
| 2017/0257785 A1* | 9/2017 | Henttonen | H04W 24/10 |
| 2017/0273015 A1* | 9/2017 | Kim | H04W 56/0015 |
| 2017/0311230 A1* | 10/2017 | Yang | H04W 48/08 |

OTHER PUBLICATIONS

LG Electronics, "DRS-based measurements with network assistance", R1-142138, 3GPP TSG RAN WG1 Meeting #77, Seoul, Korea, May 19-23, 2014, See pp. 1-4.

* cited by examiner

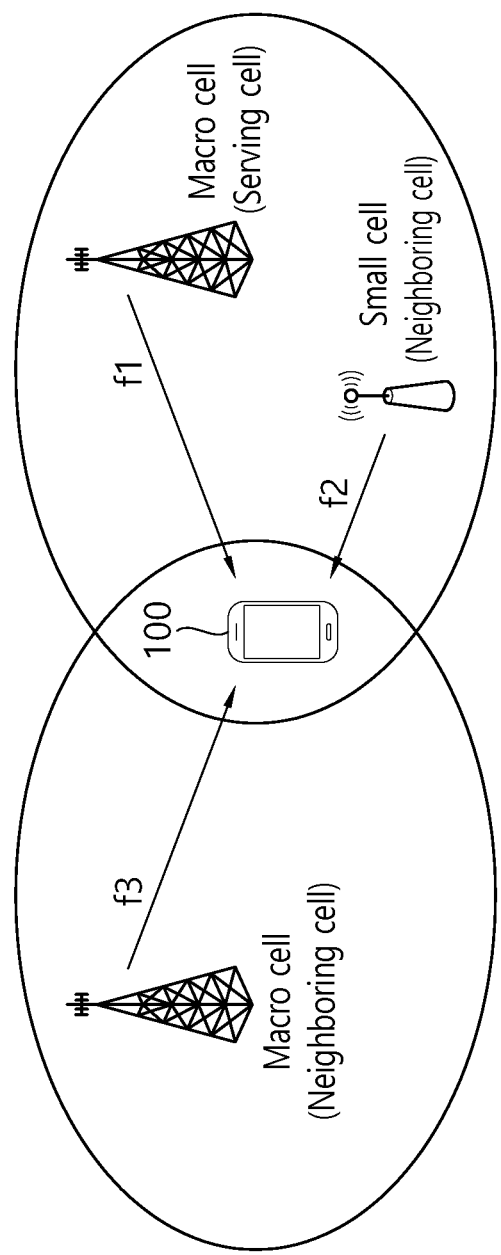

METHOD OF MEASURING SMALL CELL AND USER EQUIPMENT

CROSS REFERENCE TO RELATED APPLICATIONS

This application is the National Phase of PCT International Application No. PCT/KR2015/011851, filed on Nov. 5, 2015, which claims priority under 35 U.S.C. 119(e) to U.S. Provisional Application No. 62/075,905, filed on Nov. 6, 2014, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, a user equipment continuously measures the quality of a serving cell that provides a service currently and the quality of a neighboring cell. Largely, this measurement includes the measurement of a reference signal received power (RSRP) and the measurement of a reference signal received quality (RSRQ). The RSRQ is represented by the value of the RSRP divided by a received signal strength indicator (RSSI).

On the other hand, in a next generation mobile communication system, it is anticipated that a small cell of which cell coverage radius is small is going to be added in the coverage of the existing cell. Such a small cell may be turned off depending on a situation. As such, in order to make it possible to measure the small cell in the off state, the small cell may transmit a new discovery signal (DS) in addition to the existing PSS/SSS. The small cell in the off state transmits the discovery signal infrequently.

Meanwhile, since the discovery signal is transmitted infrequently, there is a problem that the RSSI measured by the user equipment is dramatically changed depending on a time, and accordingly, the value of RSRQ is changed dramatically.

SUMMARY OF THE INVENTION

Accordingly, an object of the present invention is to solve the above-mentioned problems.

In order to accomplish the object described above, a disclosure of the present specification provides a method for measuring a neighbor small cell. The method may include receiving a measurement configuration information from a serving cell; and performing a measurement for the serving cell, the neighboring small cell and a neighboring macro cell. The measurement configuration information may include one or more of a Discovery Signal Measurement Timing Configuration (DMTC) for the neighboring small cell and a Measurement Gap (MG). The DMTC may include DMTC period information and information of an occasion duration of a discovery signal. When all of a frequency band in which the serving cell operates, a frequency band in which the neighboring small cell operates and a frequency band in which the neighboring macro cell are a same, a measurement for the neighboring small cell may be performed during a time duration by the DMTC and a measurement for the serving cell may be performed during a duration except the time duration by the DMTC.

As such, when all of the frequency band in which the serving cell operates, the frequency band in which the neighboring small cell operates and the frequency band in which the neighboring macro cell are a same, the method may further include receiving signaling instructing to perform the measurement during the time duration by the DMTC and a duration except the time duration by the DMTC, respectively.

When all of the frequency band in which the serving cell operates, the frequency band in which the neighboring small cell operates and the frequency band in which the neighboring macro cell are different with each other, the measurement for the neighboring small cell may be performed during a duration in which the time duration by the DMTC and the time duration by the MG are overlapped, and a measurement for the neighboring macro cell may be performed during the time duration by the MG not overlapped with the time duration by the DMTC.

Meanwhile, when all of the frequency band in which the serving cell operates, the frequency band in which the neighboring small cell operates and the frequency band in which the neighboring macro cell are different with each other, the DMTC period may have a greater value than a period of the MG.

When the frequency band in which the neighboring small cell operates and the frequency band in which the neighboring macro cell are a same, but different from the frequency band in which the serving cell operates, the method may further include receiving signaling instructing to perform the measurement during a duration except the time duration by the DMTC.

As such, when the frequency band in which the neighboring small cell operates and the frequency band in which the neighboring macro cell are a same, but different from the frequency band in which the serving cell operates, the measurement for the neighboring small cell may be performed during a duration in which the time duration by the DMTC and the time duration by the MG are overlapped, and a measurement for the neighboring macro cell may be performed during the time duration by the MG not overlapped with the time duration by the DMTC.

The discovery signal may include one or a combination of a Primary Synchronization Signal (PSS), a Secondary Synchronization Signal (SSS), a Cell-specific Reference Signal (CRS) and a Channel State Information Reference Signal (CSI-RS).

In order to accomplish the object described above, a disclosure of the present specification provides a user equipment for measuring a neighbor small cell. The user equipment may include a RF unit; and a processor for controlling the RF unit. The processor is configured to perform receiving a measurement configuration information from a serving cell; and performing a measurement for the serving cell, the neighboring small cell and a neighboring macro cell. The measurement configuration information may include one or more of a Discovery Signal Measurement Timing Configuration (DMTC) for the neighboring small cell and a Measurement Gap (MG). The DMTC may include DMTC period information and information of an occasion duration of a discovery signal. When all of a frequency band in which the serving cell operates, a frequency band in which the neighboring small cell operates and a frequency band in which the neighboring macro cell are a same, a measurement for the neighboring small cell may be performed during a time duration by the DMTC and a measurement for the serving cell may be performed during a duration except the time duration by the DMTC.

ADVANTAGEOUS EFFECTS

According to the embodiment of the present disclosure, the aforementioned problem of the related art is solved.

BRIEF DESCRIPTION OF THE DRAWINGS

FIG. 16b illustrates the measurements of the example shown in FIG. 16a.

FIG. 17a illustrates an example that all of a serving macro cell, a neighboring macro cell and a neighboring small cell operate in different frequencies, and FIG. 17b illustrates the measurements of the example shown in FIG. 17a.

FIG. 18b illustrates the measurements of the example shown in FIG. 18a.

DESCRIPTION OF EXEMPLARY EMBODIMENTS

Figure 1:
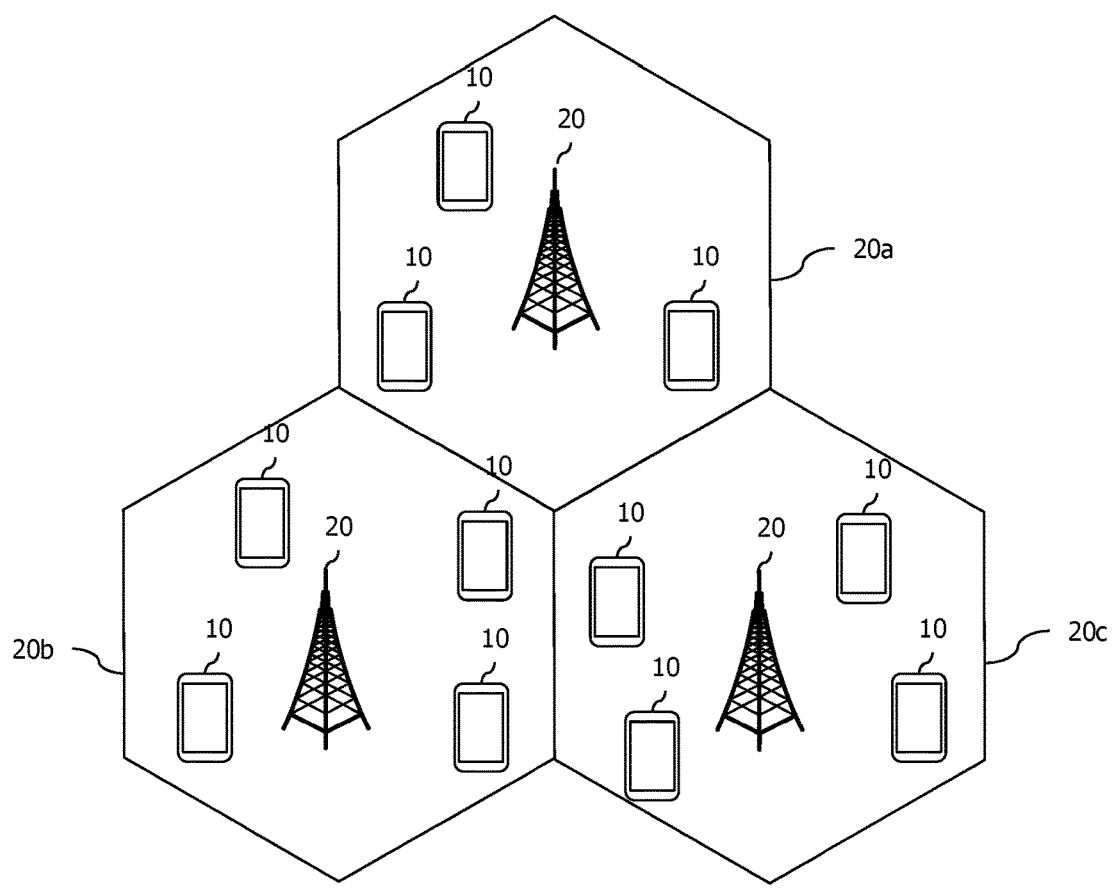
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
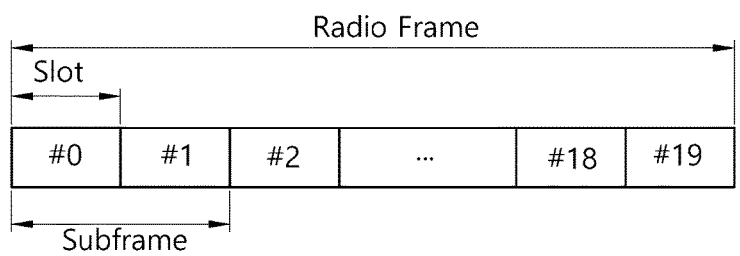
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
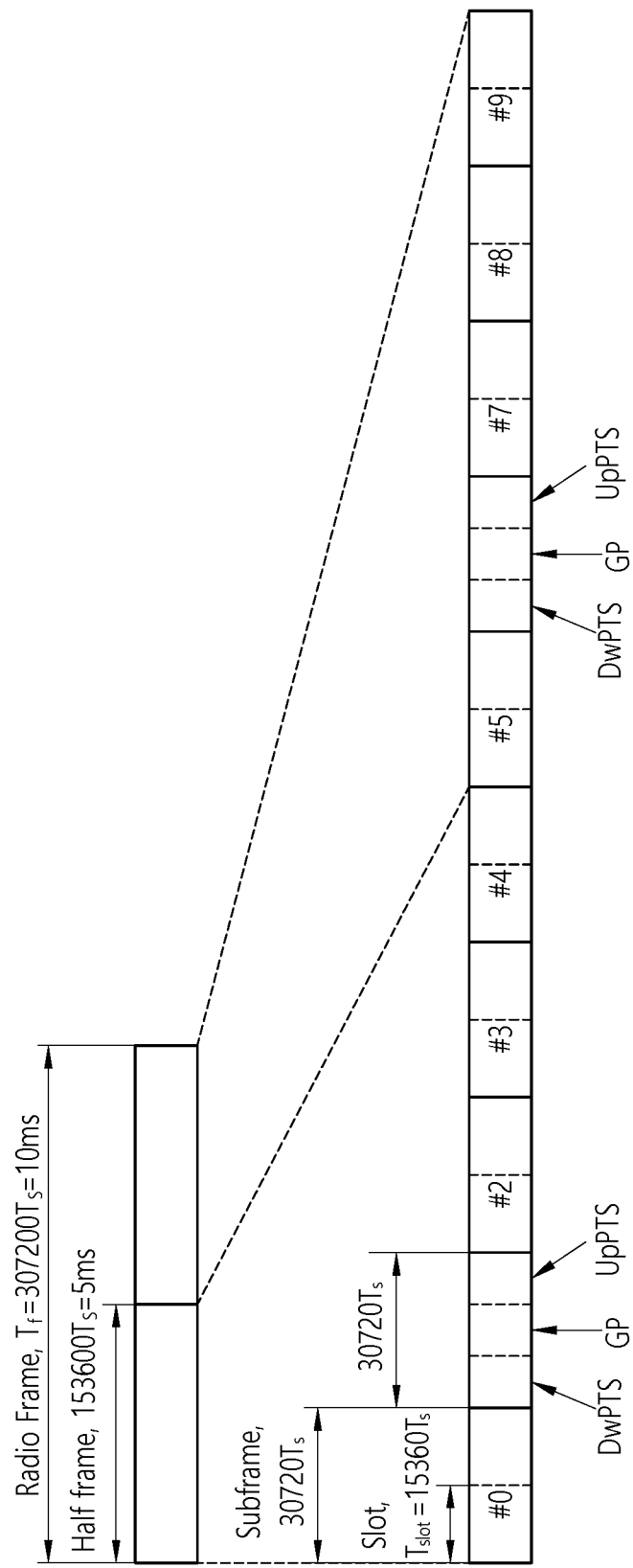
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame.

When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
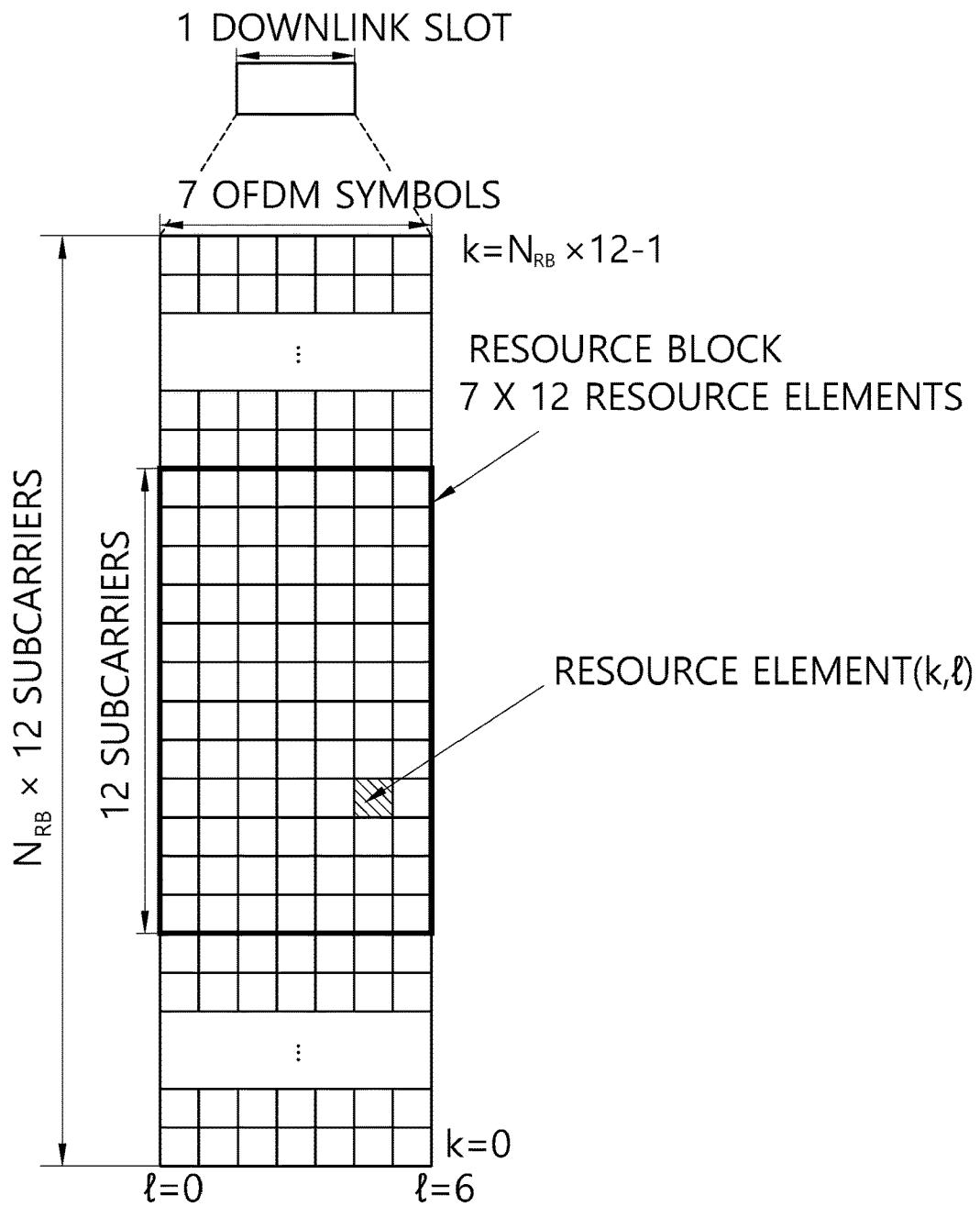
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
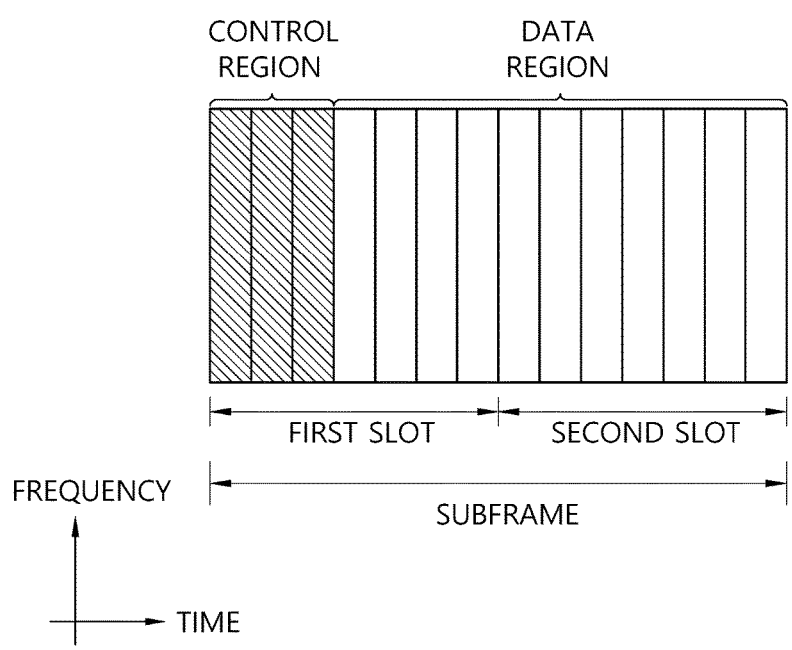
FIG. 5 illustrates a structure of a downlink subframe.

FIG. 5 illustrates the architecture of a downlink subframe.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
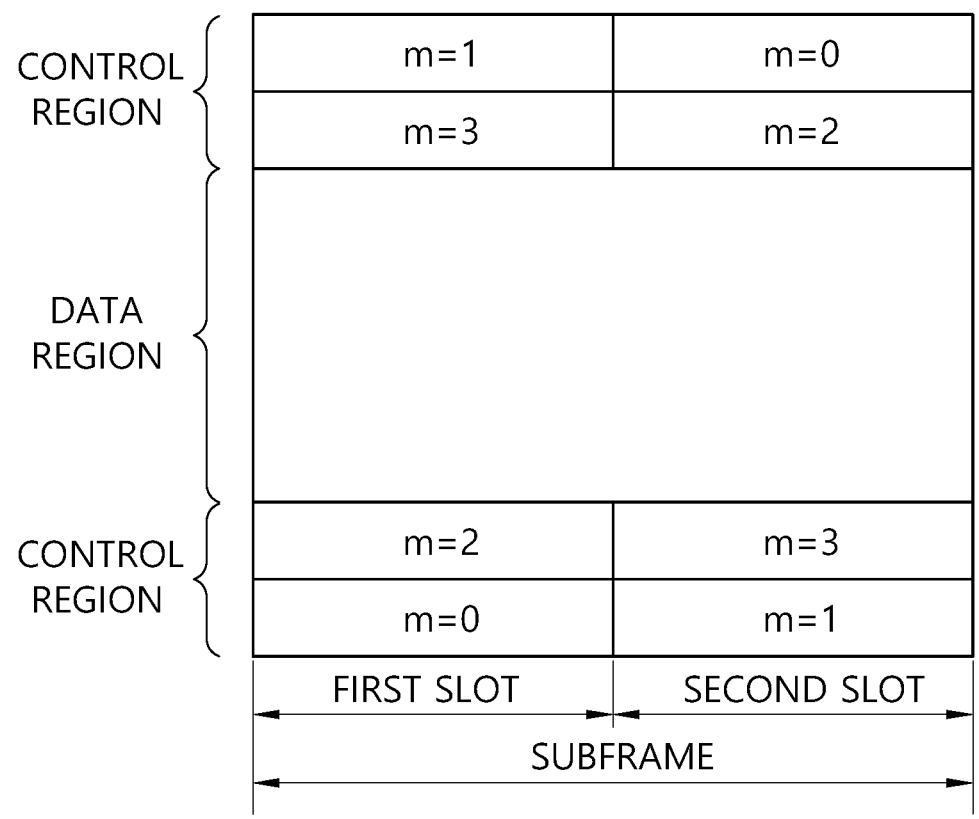
FIG. 6 illustrates the architecture of an uplink sub-frame in 3GPP LTE.

FIG. 6 illustrates the architecture of an uplink subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Synchronization Signal>

In LTE/LTE-A systems, synchronization with a cell is obtained through a synchronization signal (SS) in a cell search process.

The synchronization signal is described in detail below with reference to FIG. 7.

Figure 7:
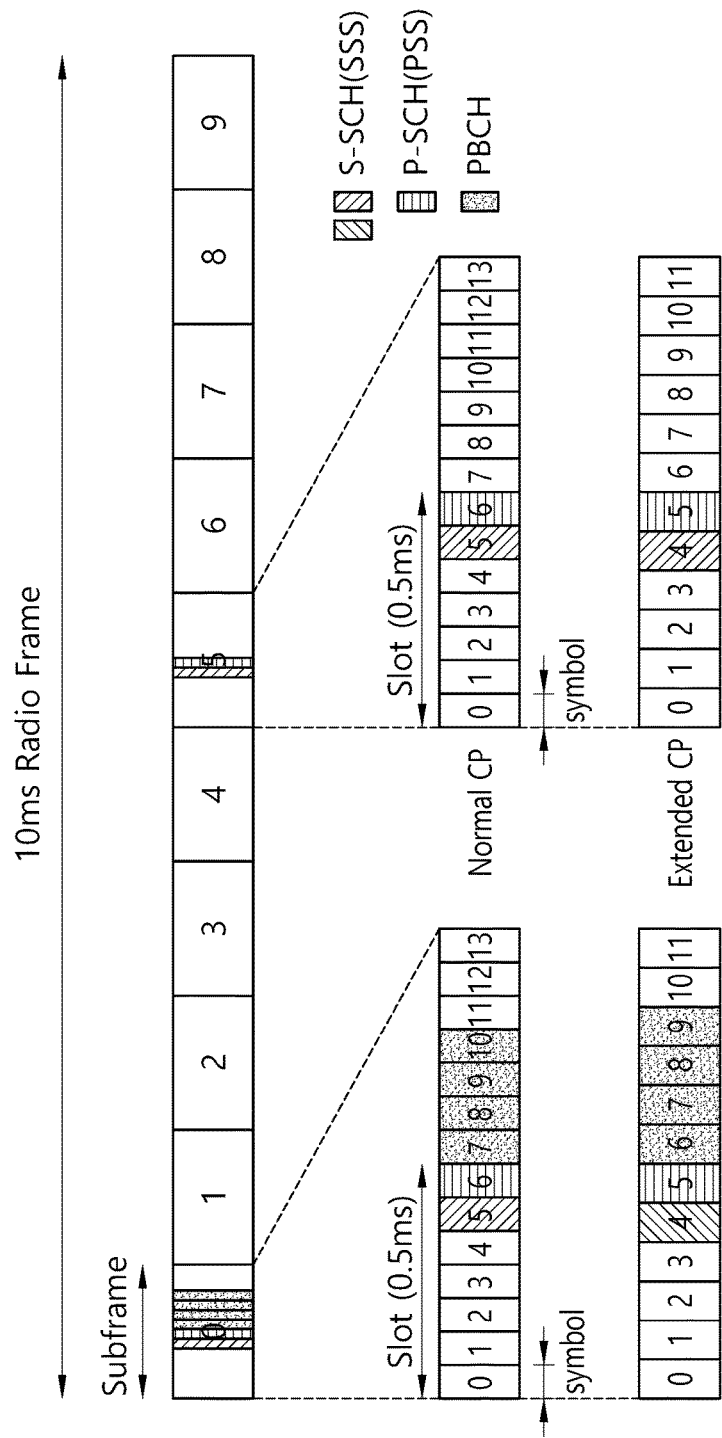
FIG. 7 illustrates a frame structure for transmitting a synchronization signal in a FDD frame.

FIG. 7 illustrates a frame structure for the transmission of a synchronization signal in an FDD frame.

A slot number and a subframe number starts with 0. UE may perform time and frequency synchronization based on a synchronization signal received from an eNodeB. In 3GPP LTE-A, a synchronization signal is used for cell search and may be divided into a primary synchronization signal (PSS) and a secondary synchronization signal (SSS). In 3GPP LTE-A, for a synchronization signal, reference may be made to Paragraph 6.11 of 3GPP TS V10.2.0 (2011-06).

A PSS is used to obtain OFDM symbol synchronization or slot synchronization and associated with a physical-layer cell identity (PCI). Furthermore, an SSS is used to obtain frame synchronization. Furthermore, an SSS is used to detect a CP length and to obtain a physical layer cell group ID.

A synchronization signal may be transmitted in a subframe No. 0 and a subframe No. 5 several time by taking into consideration 4.6 ms, that is, the length of a GSM (global system for mobile communication) frame in order to facilitate inter-RAT (radio access technology) measurement. The boundary of the frame may be detected through an SSS. More specifically, in an FDD system, a PSS is transmitted in the last OFDM symbol of a slot No. 1 or a slot No. 10, and an SSS is transmitted in an OFDM symbol right before a PSS.

A synchronization signal may send any one of a total of 504 physical cell IDs through a combination of three PSSs and 168 SSSs. A PBCH (physical broadcast channel) is transmitted in the first 4 OFDM symbols of the first slot. A synchronization signal and PBCH are transmitted within center 6 Rbs within a system bandwidth so that UE can detect or demodulate the synchronization signal regardless of a transmission bandwidth. A physical channel in which a PSS is transmitted is called a P-SCH, and a physical channel in which an SSS is transmitted is called an S-SCH.

Figure 8:
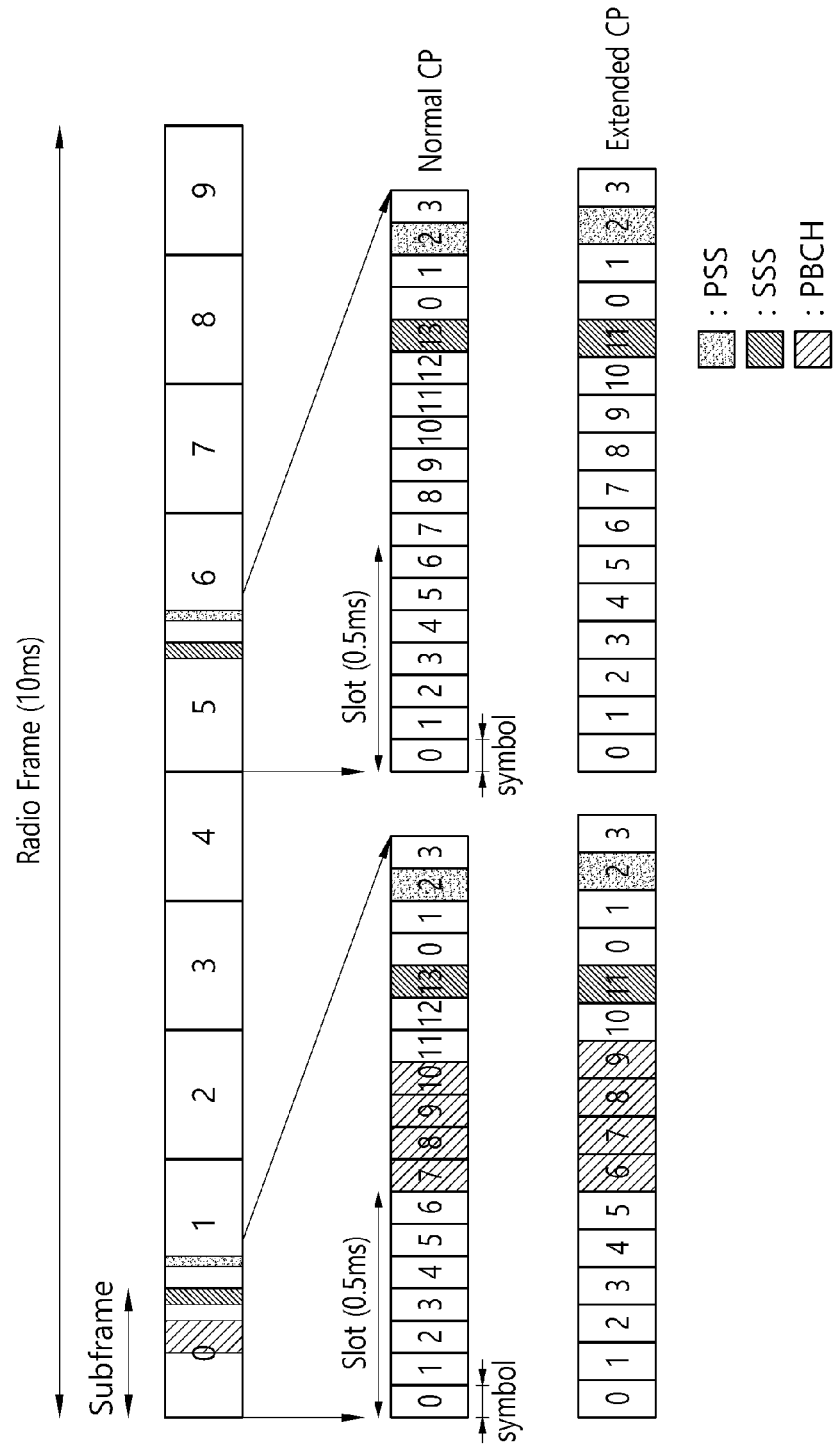
FIG. 8 illustrates a frame structure for transmitting a synchronization signal in a TDD frame.

FIG. 8 illustrates an example of a frame structure for sending a synchronization signal in a TDD frame.

In a TDD frame, a PSS is transmitted in the third OFDM symbols of a third slot and thirteenth slot. An SSS is transmitted prior to three OFDM symbols in OFDM symbols in which a PSS is transmitted. A PBCH is transmitted in the first 4 OFDM symbols of a second slot in the first subframe.

<Reference Signal>

A RS is described below.

In general, transmission information, for example, data is easily distorted and changed while it is transmitted through a radio channel. Accordingly, a reference signal is required in order to demodulate such a transmission information without an error.

The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 9:
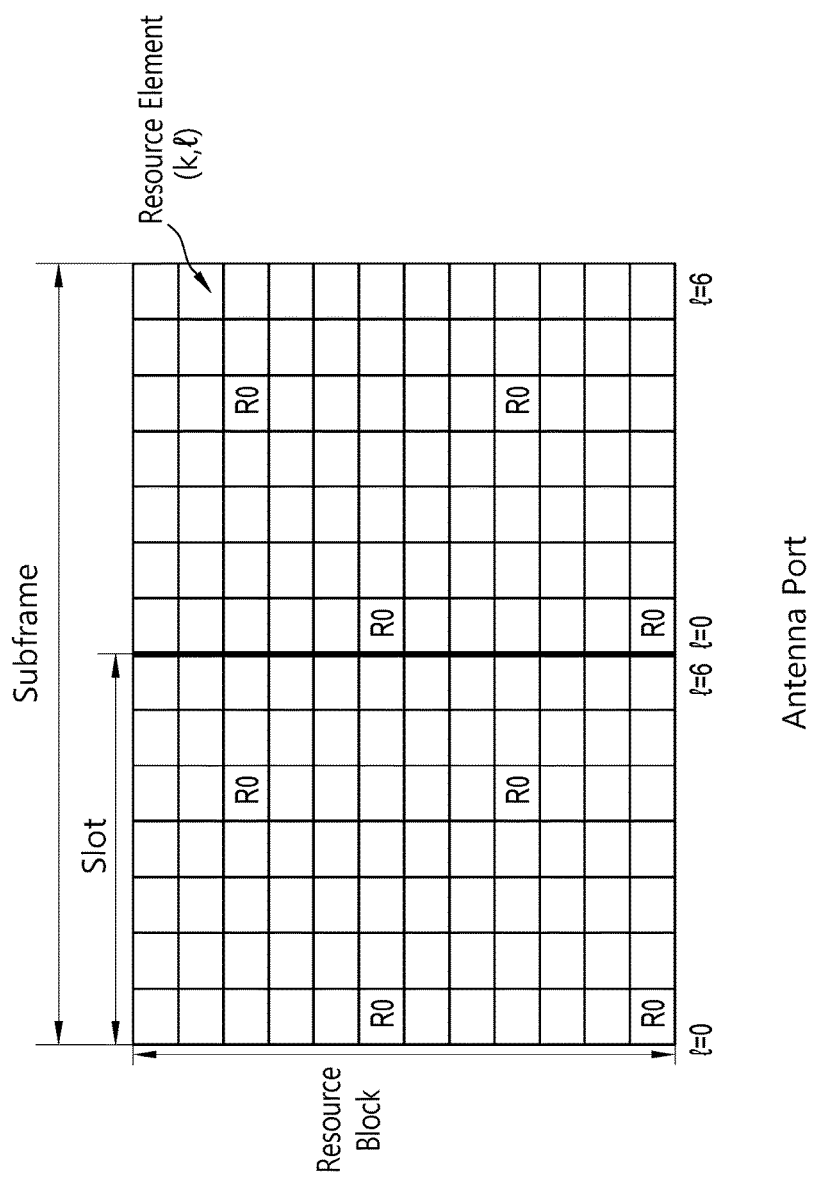
FIG. 9 illustrates an exemplary pattern with which a CRS is mapped to a RB, if a base station uses a single antenna port.

FIG. 9 illustrates an exemplary pattern with which a CRS is mapped to a RB, if a base station uses a single antenna port.

Referring to FIG. 9, R0 illustrates a resource element (RE) to which a CRS transmitted by antenna port number 0 of the base station is mapped.

The CRS is transmitted in all downlink subframes in a cell supporting a PDSCH transmission. The CRS may be transmitted on the antenna port number 0 to 3.

The RE allocated to the CRS of a single antenna port cannot be used for the transmission of other antenna ports, and should be configured as zero. Further, the CRS is only transmitted on a non-MBSFN (multicast-broadcast single frequency network) region in a MBSFN subframe.

Figure 10:
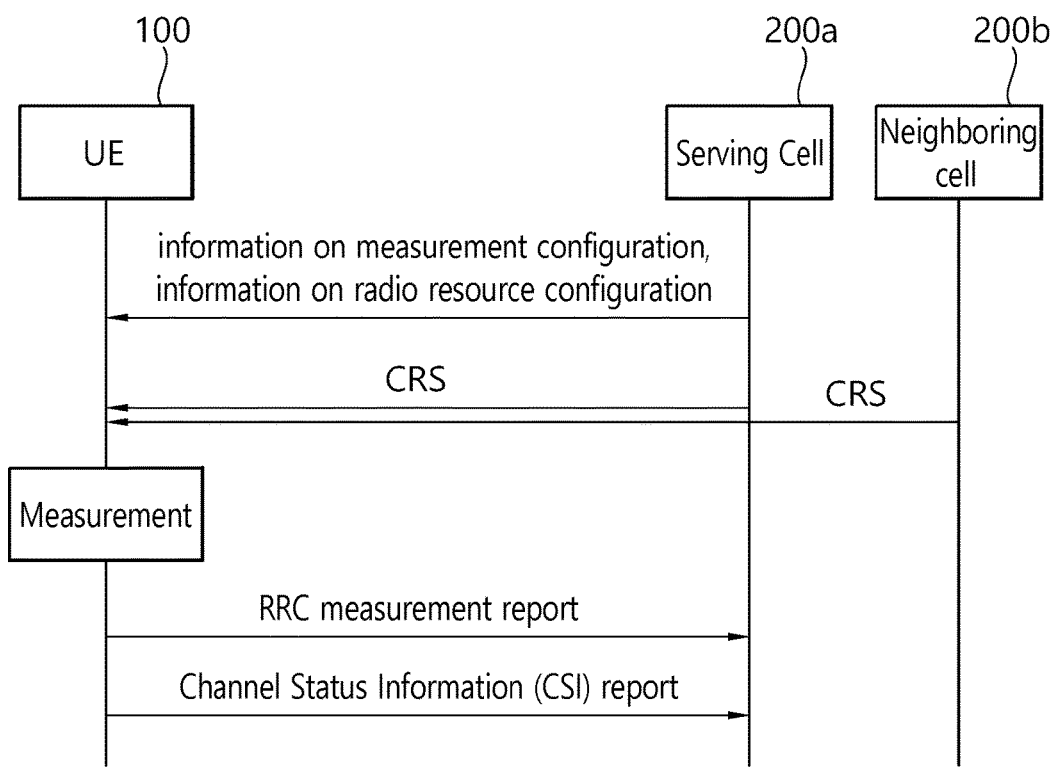
FIG. 10 illustrates a measurement and a measurement report procedure.

FIG. 10 illustrates a measurement and a measurement report procedure.

In a mobile communication system, a mobility support for UE 100 is essential. Accordingly, the UE 100 continues to measure quality of a serving cell that now provides service to the UE 100 and quality of neighbor cells. The UE 100 reports a measurement result to a network at a proper time, and the network provides optimal mobility to the UE through handover. Measurement for such a purpose is frequently called radio resource management (RRM).

Meanwhile, the UE 100 monitors downlink quality of a primary cell (Pcell) based on a CRS. This is called RLM (Radio Link Monitoring). For such RLM, the UE 100 estimates downlink quality and compares the estimated downlink quality with thresholds, for example, Qout and Qin. The threshold Qout is defined as a level in which downlink reception cannot be stably performed, and corresponds to 10% error of PDCCH transmission by taking into consideration a PCFICH error. The threshold Qin is defined as a level in which downlink may be very significantly reliable compared to the threshold Qout, and corresponds to 2% error of PDCCH transmission by taking into consideration a PCFICH error.

As may be seen with reference to FIG. 10, when a serving cell 200a and a neighbor cell 200b transmits a respective CRS (Cell-specific Reference Signal) to the UE 100, the UE 100 performs measurement through the CRS and transmits an RRC measurement report message, including a measurement result, to the serving cell 200a.

In this case, the UE 100 may perform measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): This indicates reception power measured in the entire band. The RSSI includes all of a signal, interference, and thermal noise.

3) RSRQ (reference symbol received quality): This indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

The RSRQ may be calculated as an RSSI/RSSP.

Meanwhile, the UE 100 receives a measurement configuration (hereinafter also called "measconfing") information element (IE) from the serving cell 100a. A message including the measurement configuration IE is called a measurement configuration message. In this case, the measurement configuration IE may be received through an RRC connection reconfiguration message. If a measurement result satisfies a report condition within the measconfing information, the UE reports the measurement result to an eNodeB. A message including the measurement result is called as a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell, and the inter-frequency measurement target may indicate a neighbor cell having a frequency band different from that of a serving cell, and the inter-RAT measurement target may indicate a neighbor cell having an RAT different from the RAT of a serving cell.

Specifically, the measurement configuration IE (Information Element) includes an IE, such as the following Table.

TABLE 3

MeasConfig ::=
-- Measurement objects
   measObjectToRemoveList
   measObjectToAddModList TABLE 3-continued -- Other parameters
   measGapConfig The Measurement objects IE includes measObjectToRemoveList indicative of a list of measObject to be removed and measObjectToAddModList indicative of a list that may be newly added or modified.

Meanwhile, the measGapConfig is used to configure or release the measurement gap (MG).

The measurement gap (MG) is a duration to perform a cell identification or a RSRP measurement on an inter frequency different from a frequency of the serving cell.

Meanwhile, the UE 100 receives a radio resource configuration (RRC) information element (IE) as shown.

The radio resource configuration (RRC) dedicated information element (IE) is used to configure/modify/release a radio bearer, or modify a MAC configuration etc. The radio resource configuration IE includes subframe pattern information. The subframe pattern information is information on a measurement resource restriction pattern in a time domain to measure the RSRP, and the RSRQ for the serving cell (e.g. a primary cell).

Figure 11:
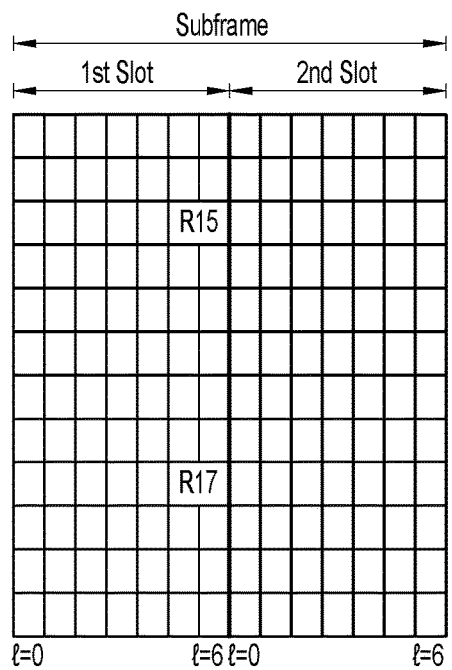
FIG. 11 illustrates an exemplary RB to which a CSI-RS of reference signals is mapped.
Figure 11:
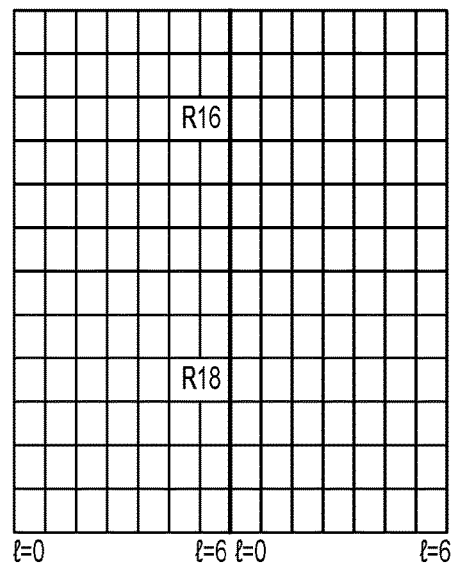
Figure 11:
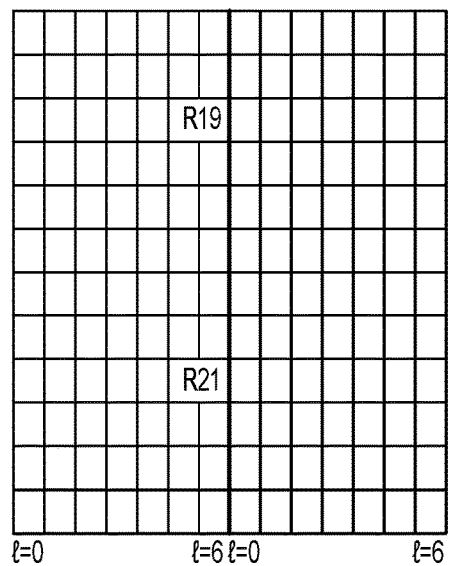
Figure 11:
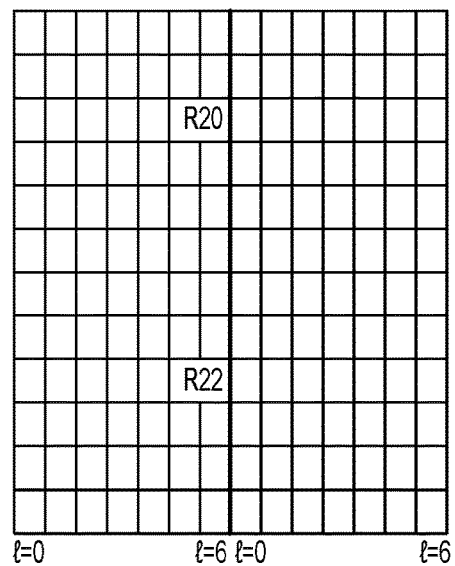

FIG. 11 illustrates an exemplary RB to which a CSI-RS of reference signals is mapped.

A CSI-RS is used for channel measurement for the channel estimation and channel information of the PDSCH of LTE-A UE. The CSI-RS is deployed relatively sparsely in a frequency domain or time domain and may be punctured in the data region of a subframe or MBSFN subframe. If it is required to estimate a CSI, a CQI, PMI, and RI may be reported by UE.

The CSI-RS is transmitted through a 1, 2, 4, or 8 antenna ports. Antenna ports used in this case are p=15, p=15, 16, p=15, ..., 18, and p=15, ..., 22. That is, the CSI-RS may be transmitted through 1, 2, 4, 8 antenna ports. The CSI-RS may be defined with respect to only a subcarrier duration $\Delta f=15$ kHz. For the CSI-RS, reference may be made to Paragraph 6.10.5 of 3GPP (3rd Generation Partnership Project) TS 36.211 V10.1.0 (March 2011) "Technical Specification Group Radio Access Network; Evolved Universal Terrestrial Radio Access (E-UTRA); Physical channels and modulation (Release 8)."

In the transmission of the CSI-RS, a maximum of 32 different configurations may be proposed in order to reduce ICI (inter-cell interference) in a multi-cell environment including a heterogeneous network (HetNet) environment. The CSI-RS configuration is different depending on the number of antenna ports within a cell and a CP, and a neighbor cell may have a different configuration to the greatest extent. Furthermore, the CSI-RS configuration may be divided into a case where it is applied to both an FDD frame and TDD frame and a case where it is applied to only a TDD frame depending on a frame structure. In a single cell, a plurality of CSI-RS configurations may be used. A zero or one CSI-RS configuration may be used for UE that assumes a non-zero power CSI-RS, and zero or some CSI-RS configurations may be used for UE that assumes a zero power CSI-RS.

The following table illustrates a configuration of the CSI-RS in a normal CP.

TABLE 4

| | CSI-RS configuration index | Number of CSI-RS configuration | | | | | |
|---|---|---|---|---|---|---|---|
| | | 1 or 2 | | 4 | | 8 | |
| | | (k', l') | ns mod 2 | (k', l') | ns mod 2 | (k', l') | ns mod 2 |
| TDD and FDD frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The following table illustrates a configuration of the CSI-RS in an extended CP.

TABLE 5

| | CSI-RS configuration index | Number of CSI-RS configuration | | | | | |
|---|---|---|---|---|---|---|---|
| | | 1 or 2 | | 4 | | 8 | |
| | | (k', l') | ns mod 2 | (k', l') | ns mod 2 | (k', l') | ns mod 2 |
| TDD and FDD frame | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |

TABLE 5-continued

| CSI-RS | Number of CSI-RS configuration | | | | | |
|---|---|---|---|---|---|---|
| configuration | 1 or 2 | | 4 | | 8 | |
| index | (k', l') | ns mod 2 | (k', l') | ns mod 2 | (k', l') | ns mod 2 |
| 26 | (1, 1) | 1 | | | | |
| 27 | (0, 1) | 1 | | | | |

In the above two tables, UE may send a CSI-RS only in a downlink slot that satisfies the condition of ns mod 2. Furthermore, UE does not send a CSI-RS in a subframe in which the transmission of a special subframe, CSI-RS of a TDD frame collides against a synchronization signal, a PBCH (physical broadcast channel), and a system information block type 1 (SystemInformationBlockType1) or a subframe in which a paging message is transmitted. Furthermore, in a subset S, that is, S={15}, S={15, 16}, S={17, 18}, S={19, 20} or S={21, 22}, a resource element in which the CSI-RS of a single antenna port is transmitted is not used for the transmission of the CSI-RS of a PDSCH or another antenna port.

Meanwhile, FIG. 11 illustrates resource elements used for CSI-RS when a CSI-RS configuration index is 0 in a normal CP structure. Rp illustrates a resource element used for CSI-RS transmission on an antenna port p. Referring to FIG. 11, a CSI-RS for antenna ports 15 and 16 is transmitted through resource elements corresponding to the third subcarrier (i.e., subcarrier index 2) of the sixth and the seventh OFDM symbols (i.e., OFDM symbol indices 5, 6) of a first slot. A CSI-RS for antenna ports 17 and 18 is transmitted through resource elements corresponding to the ninth subcarrier (i.e., subcarrier index 8) of the sixth and the seventh OFDM symbols (OFDM symbols indices 5, 6) of the first slot. A CSI-RS for antenna ports 19 and 20 is transmitted through the same resource elements as those in which the CSI-RS for the antenna ports 15 and 16 is transmitted. The CSI-RS for the antenna ports 21 and 22 is transmitted through the same resource elements as those in which the CSI-RS for the antenna ports 17 and 18 are transmitted.

If the CSI-RS through eight antenna ports is transmitted to UE, the UE may receive an RB to which R15 to R22 has been mapped. That is, the UE may receive a CSI-RS having a specific pattern.

Meanwhile, a small cell is described below.
<Introduction of Small Cell>

In the next-generation mobile communication system, it is expected that a small cell having a small coverage radius will be added to the coverage of an existing cell and a small cell may process more traffic. The existing cell is called a macro cell because it has greater coverage than the small cell. This is described below with reference to FIG. 7.

Figure 12:
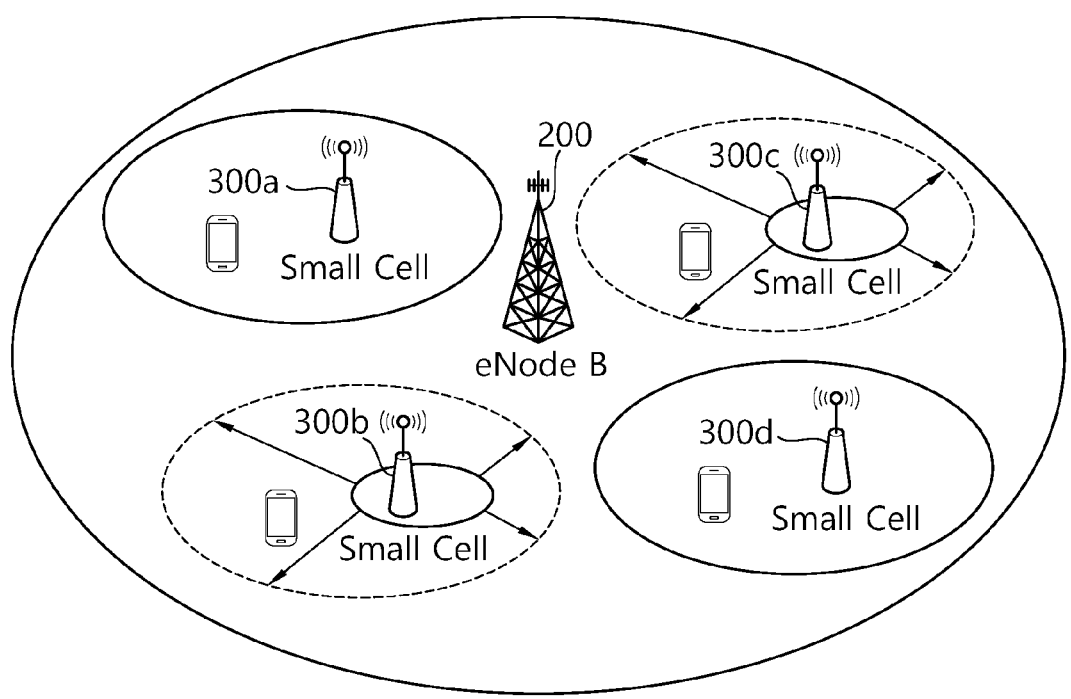
FIG. 12 is a diagram illustrating a heterogeneous network environment in which a macro cell and small cells having a possibility that they may become the next-generation wireless communication system are mixed.

FIG. 12 is a diagram illustrating a heterogeneous network environment in which a macro cell and small cells having a possibility that they may become the next-generation wireless communication system are mixed.

Referring to FIG. 12, a macro cell according to an existing eNodeB 200 has a heterogeneous network environment in which overlaps with small cells according to one or more small eNodeBs 300a, 300b, 300c, and 300d. The existing eNodeB is also called a macro eNodeB (MeNB) because it provides coverage greater than the small eNodeB. In this specification, a macro cell and a macro eNodeB are interchangeably used. UE connected to the macro cell 200 may be called macro UE. The macro UE receives a downlink signal from a macro eNodeB and sends an uplink signal to a macro eNodeB.

In such a heterogeneous network, the coverage gap of a macro cell may be filled by configuring the macro cell as a primary cell (Pcell) and configuring the small cell as a secondary cell Scell. Furthermore, overall performance can be boosted by configuring a small cell as a primary cell (Pcell) and configuring a macro cell as a secondary cell Scell.

Meanwhile, if the small cell is deployed as described above, an inter-cell interference problem may be worsened. In order to solve this problem, as illustrated in FIG. 12, the coverage size of the small cell may be reduced depending on its situation. Alternatively, the small cell may be off and then on depending on the situation.

Figure 13:
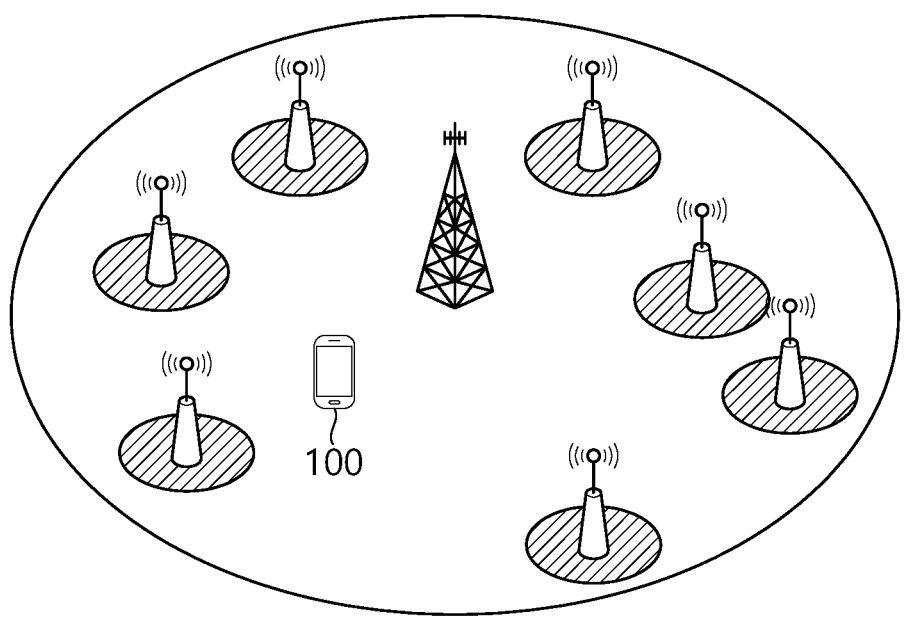
FIG. 13 is an exemplary diagram illustrating the situation in which small cells have been densely deployed.

FIG. 13 is an exemplary diagram illustrating the situation in which small cells have been densely deployed.

Referring to FIG. 13, illustrated is the state in which small cells have been densely deployed within the coverage of a macro cell. In this state, it may be difficult for UE 100 to detect the small cells within a short time. In particular, as described above, cell detection is performed through the reception of a PSS/SSS. However, if many small cells send PSS/SSSs at the same timing, that is, on subframes Nos. 0 and 5, it may be difficult for the UE 100 to receive all the PSS/SSSs at once. Furthermore, if the small cells send the PSS/SSSs on the subframes Nos. 0 and 5 at the same time, mutual interference may be generated. As a result, it may be difficult for the UE 100 to correct receive the PSS/SSSs.

In order to solve the problem, the small cell may transmit a new discovery signal (DS) in addition to the existing PSS/SSS. Hereinafter, it will be explained by referring to FIG. 14.

Figure 14:
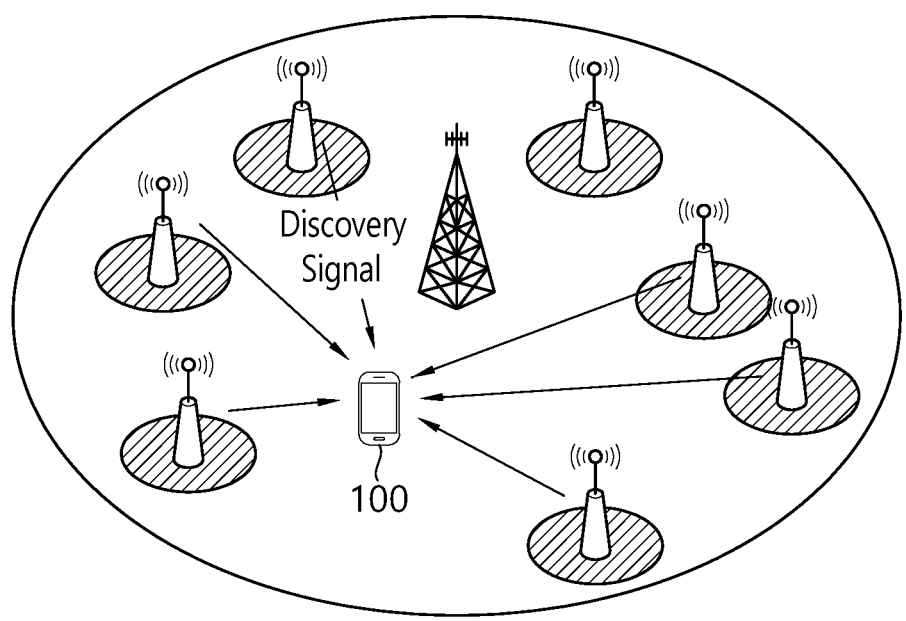
FIG. 14 illustrates an example in which the small cell transmits a discovery signal.

FIG. 14 illustrates an example in which the small cell transmits the discovery signal.

As may be seen with reference to FIG. 14, in order for UE to efficiently detect small cells, the small cell sends a new discovery signal (DS) in addition to an existing PSS/SSS. The discovery signal may be periodically transmitted even from the small cell of which a state is off.

The discovery signal may also be called a discovery reference signal (DRS). Accordingly, the UE needs to perform a cell search process or cell detection process using the discovery signal in addition to the existing PSS/SSS.

Figure 15:
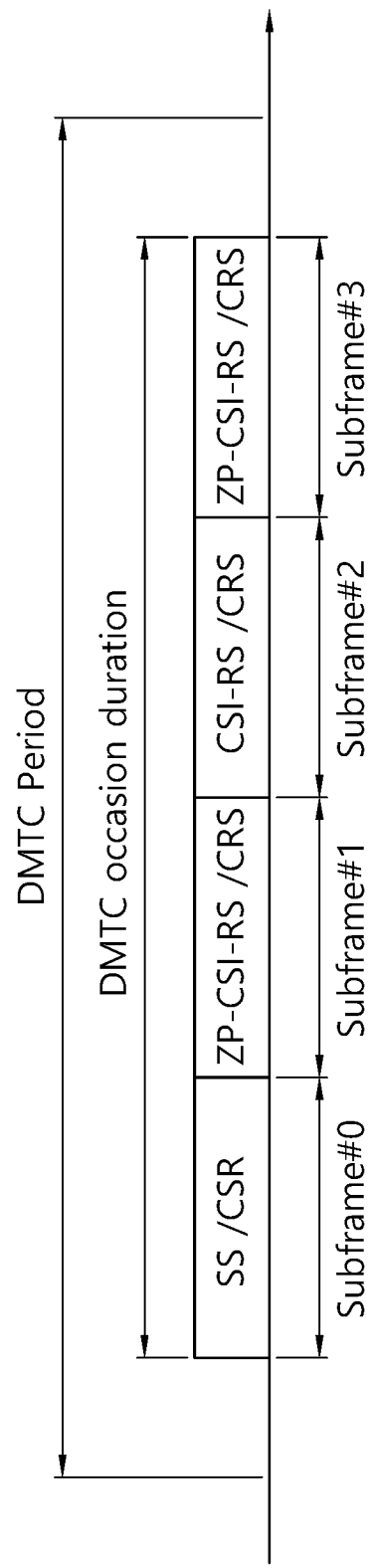
FIG. 15 illustrates an example of the discovery signal.

FIG. 15 illustrates an example of the discovery signal.

As may be seen with reference to FIG. 15, the discovery signal (DS) may be a combination of the followings.

CRS of antenna port 0 during a DwPTS of all downlink subframe and special subframe.
PSS on the first subframe of a period in a frame type 1 for the FDD or PSS on the second subframe of a period in a frame type 2 for the TDD
SSS on the first subframe in a period
None-zero power CSI-RS on zero or one or more subframe in the period That is, the discovery signal (DS) may be a combination of the CRS, SS (i.e. PSS and SSS), and the CSI-RS.

Meanwhile, as shown in FIG. 15, an occasion duration of the discovery signal (DS) is as follows.

Continuous subframe of which a number is one through five, in the frame type 1 for the FDD.
Continuous subframe of which a number is two through five, in the frame type 2 for the TDD.

Meanwhile, the UE may receive, from an eNB, a discovery signal measurement timing configuration (DMTC) which is timing information for a discovery signal based measurement. The DMTC may be received in the MeasDS-Config field illustrated in the following table. The MeasDS-Config field may be received to be included in the Measurement objects illustrated in the Table 3. That is, the MeasDS-Config field in which the DMTC is defined, may be received to be included in the Measurement objects in a measurement configuration (MeasConfig) illustrated in the Table 3.

The UE does not consider that a transmission of the discovery signal has been sent on a subframe which is not defined in the DMTC.

TABLE 6 explanation of the MeasDS-Config field csi-RS-IndividualOffset
CSI-RS individual offset applicable to a specific CSI-RS resource
dmtc-PeriodOffset
This means a dmtc-Periodicity and a dmtc-offset for a given frequency. The DMTC Periodicity may be 40 ms, 80 ms, and . . . The DMTC offset is represented as the number of the subframe. The occasion duration of the DMTC is 6 ms.
ds-OccasionDuration
This means the occasion duration of the discovery signal for a given frequency. The occasion duration of the discovery signal is common to all cells which transmits the discovery signal on the given frequency.
physCellId
This means a physical cell ID. The UE assumes that the CSI-RS and the PSS/SSS/CRS corresponding to the physical cell ID is quasi co-located for a mean delay and a Doppler shift.
resourceConfig
This means the CSI-RS configuration.
subframeOffset
This means a subframe offset between the SSS and the CSI-RS of a cell identified by the physical cell ID in the discovery signal occasion.

In the above table, the dmtc-Periodicity is a periodicity of measurement, and may indicate one of 40 ms, 80 ms, and 160 ms. In accordance with the periodicity, for example, the UE may perform a measurement once for every 160 ms based on the discovery signal (DS). The ds-OccasionDuration is the occasion duration of the discovery signal, and indicates the appropriate number of subframe of continuous subframe of one through five for the case of FDD, and indicates the appropriate number of subframe of continuous subframe of two through five for the case of TDD. For example, if the dmtc-Periodicity is 160 ms, and the occasion duration of the DMTC is 6 ms, the UE measures the discovery signal from the small cell for 6 ms.

Meanwhile, the techniques for the small cell up to now are arranged as below.

In order to distinguish and measure a small cell, discovery signal and measurement duration are newly defined. In order for a UE to distinguish and measure a small cell, the UE uses the discovery signal measurement timing configuration (DMTC) information received from a serving cell. The occasion duration of the DMTC is 6 ms, and the period of the DMTC is one of 40 ms, 80 ms and 160 ms. That is, a UE performs the operation of detecting and measuring a small cell within 6 ms, which is the DMTC period. According to the occasion duration of a discovery signal (DS), the DS may be measured on consecutive 1 to 5 subframes in the case of the FDD, and may be measured on consecutive 2 to 5 subframes in the case of the TDD. An SSS and a CRS are received on the first subframe among the subframes, and a PSS is further received in the case of the FDD. In the case of the TDD, a PSS is received on the second subframe among the subframes.

The small cell may be turned on or turned off. Since a UE is unable to get the information on whether the small cell is on state or off state in advance, the UE detects and measures a cell using a discovery signal always regardless of the on/off state of the small cell.

The use of the DS is an acquisition of synchronization through PSS/SSS, an RSRP measurement based on a CRS, an acquisition of a CSI-RS and an RSRP measurement based on a CSI-RS.

The occasion duration of a DS includes consecutive 1 to 5 subframes in the case of the FDD, and includes consecutive 2 to 5 subframes in the case of the TDD.

As described above, the SSS/CRS is received on the first subframe in the occasion duration of a DS, and the CSI-RS is received on the position away from the SSS subframe as much as subframeoffset value in Table 3 above.

On the other hand, largely, a measurement includes the measurement of an RSRP and the measurement of an RSRQ. The RSRQ is represented by the value of the RSRP divided by total received signal size (RSSI). In addition, a measurement is divided into an intra-frequency measurement performed on the same frequency band as the frequency band of a serving cell and an inter-frequency measurement performed on different frequency band from the frequency band of a serving cell.

However, as described above, a neighboring small cell may be turned on or turned off, and accordingly, there is a problem that the RSRQ is not accurately measured.

<Disclosure of the Present Specification>

Accordingly, the present specification proposes a way to solve the problem described above.

Hereinafter, the way of the present specification will be described by exemplifying three cells (i.e., a serving macro cell, a neighboring macro cell and a neighboring small cell) with reference to each drawing.

Figure 16A:
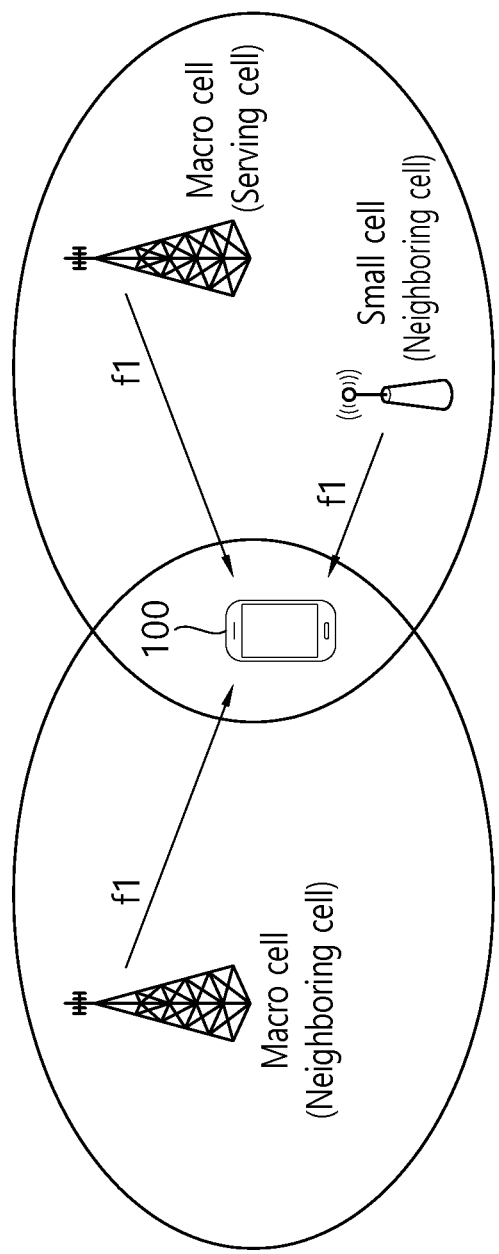
FIG. 16a illustrates an example that all of a serving macro cell, a neighboring macro cell and a neighboring small cell operate in the same frequency.
Figure 16B:
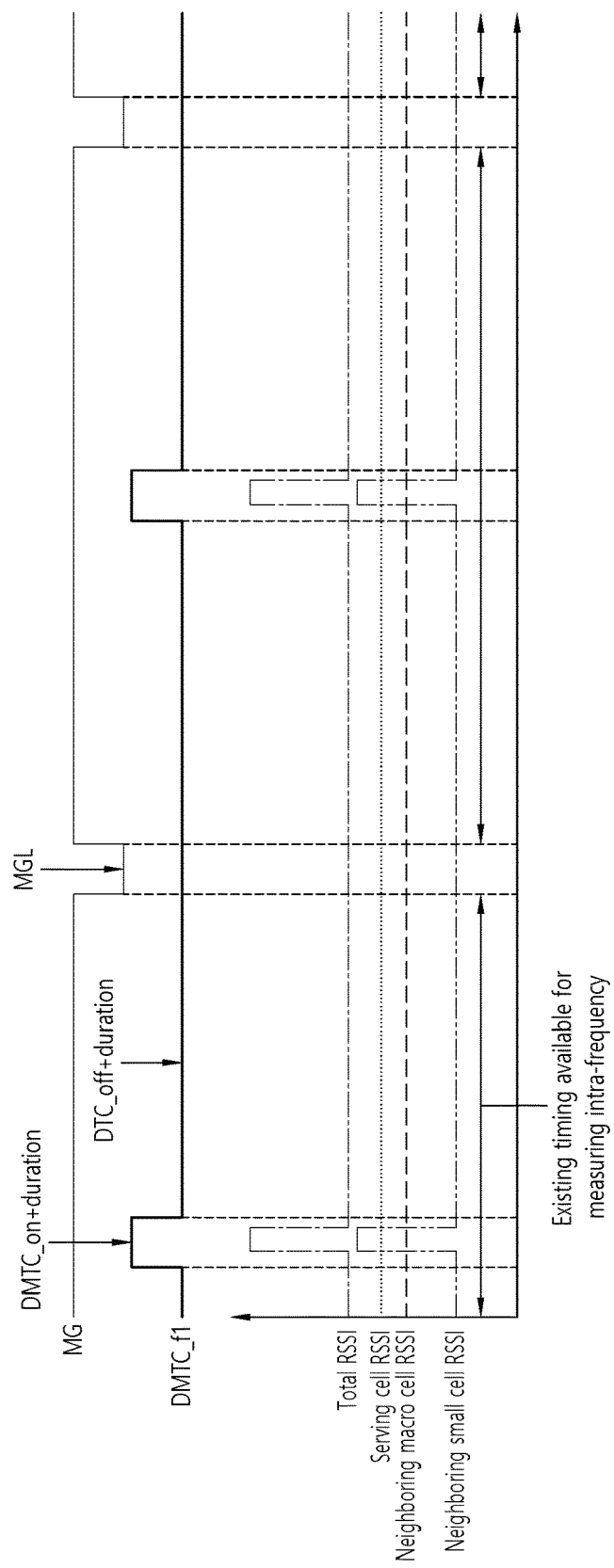

FIG. 16*a* illustrates an example that all of a serving macro cell, a neighboring macro cell and a neighboring small cell operate in the same frequency, and FIG. 16*b* illustrates the measurements of the example shown in FIG. 16*a*.

Referring to FIG. 16*a*, all of the serving macro cell, the neighboring macro cell and the neighboring small cell operate in the same frequency f1.

FIG. 16*b* illustrates the result for a UE 100 to measure an RSSI in the case that both of the serving macro cell and the neighboring macro cell transmit a downlink signal with the same transmission power, and the neighboring small cell is turned off in the situation described above.

MG shown in FIG. 16*b* is an acronym of measurement gap and MGL shown in FIG. 16*b* is an acronym of measurement gap length. The MGL means the time duration for measuring the neighboring cell that operates on different frequency band from the frequency band of the serving macro cell. Meanwhile, such an MGL may be required or not required depending on an RF structure of a UE. For example, in the case of a UE has only a single RF and should detect or measure a cell on the inter-frequency, the UE request an MG to a serving cell and the serving cell allocates an MG and provides it to the UE. In an MGL duration, after the UE tunes the RF unit to the different frequencies, and the UE performs the cell detection and measurement. When the cell detection and measurement is finished, the UE tunes the RF unit to the frequency of the serving cell again. That is, the MGL duration is the duration for performing the inter-frequency measurement, and the duration except the MGL is the duration for performing the intra-frequency measurement.

Meanwhile, owing to the neighboring small cell, the UE receives a DMTC from the serving macro cell. In this case, assuming that the neighboring small cell is off state, the UE may receive a DS from the neighboring small cell only in the DMTC duration. In the case that the frequency band in which the neighboring small cell operates is the same as the frequency band in which the serving macro cell operates, in order for the UE to identify the neighboring small cell and to measure the RSRP and the RSRQ, the serving macro cell should configure such that the MGL of the MG is not overlapped with the DMTC. In the case that the serving macro cell configures the MGL of the MG to be overlapped with the DMTC, since the UE changes the RF unit to different frequency, the UE is unable to identify and measure the neighboring small cell. In the case that the serving macro cell configures such that the MGL of the MG is not overlapped with the DMTC, the total RSSI measured by the UE is sum of the RSSI of the serving macro cell, the RSSI of the neighboring macro cell and the RSSI of the neighboring small cell. In this case, FIG. 16b assumes and shows the RSSI of the serving macro cell and the RSSI of the neighboring macro cell are a predetermined value, not zero.

As shown in FIG. 16b, in the DMTC duration, the RSSI measured by the UE is greater than the RSSI measured by the UE in the duration except the DMTC. Owing to this, the RSRQ in the DMTC duration is calculated to be relatively smaller. What are measured by the UE in the DMTC duration are the RSRP and the RSRQ of the serving macro cell, the RSRP and the RSRQ of the neighboring macro cell and the RSRP and the RSRQ of the neighboring small cell. Further, those measured by the UE in the duration except the DMTC existed in the duration except the MGL are the RSRP and the RSRQ of the serving macro cell and the RSRP and the RSRQ of the neighboring macro cell. The RSRP and the RSRQ of the neighboring small cell are measured only within the DMTC. The RSRP of the serving macro cell and the RSRP of the neighboring macro cell are the same both in the DMTC duration and the duration except the DMTC duration. However, the RSRQ of the serving macro cell and the RSRQ of the neighboring macro cell are calculated differently in the DMTC duration and the duration except the DMTC duration. That is, the RSRQ of the serving macro cell and the RSRQ of the neighboring macro cell are measured smaller in the DMTC duration. However, since the UE does not distinguish the measurement in the DMTC duration from the measurement in the duration except the DMTC and report it to the serving macro cell, the mobility of the UE becomes decreased.

Accordingly, in order to make the mobility of the UE efficiently, the UE may operate as follows.

1) The UE is required to measure and report the RSRQ by distinguishing the DMTC duration and the duration except the DMTC. For this, the serving cell should provide a way for the UE to measure the RSRQ by distinguishing the DMTC duration and the duration except the DMTC (in this case the number of RSRQ measurement and report for the serving cell and the neighboring cell for the UE become twice in comparison with the previous case. The way is that the UE measures and reports the RSRQ by distinguishing the DMTC duration and the duration except the DMTC always, in the case that the DMTC is configured. Another way is that the serving cell forwards a new measurement signaling to the UE when the serving cell configures the DMTC for the small cell, and when the UE receives the corresponding signaling, the UE measures and reports the RSRQ for the DMTC duration and the duration except the DMTC separately. This operation may be applied to the case that the small cell is on state.

2) Meanwhile, in addition to the way above, it may be considered that the UE measures and reports the RSRQ for the serving cell and the neighboring macro cell only in the duration except the DMTC, and the UE measures and reports the RSRQ for the small cell only in the DMTC duration. Even in this case, the serving cell is required to forward signaling to the UE in order to distinguish it from the existing operation. In this case, there is an advantage that the number of the RSRQs of the serving cell and the neighboring cell reported by the UE is the same as the existing operation.

3) In the case that the UE measures and reports the RSRQ for the serving cell and the neighboring cell without distinguishing the DMTC duration from the duration except the DMTC as the same as the existing operation, the serving cell may use the RSRP reported from the UE, but not use the RSRQ.

Figure 17B:
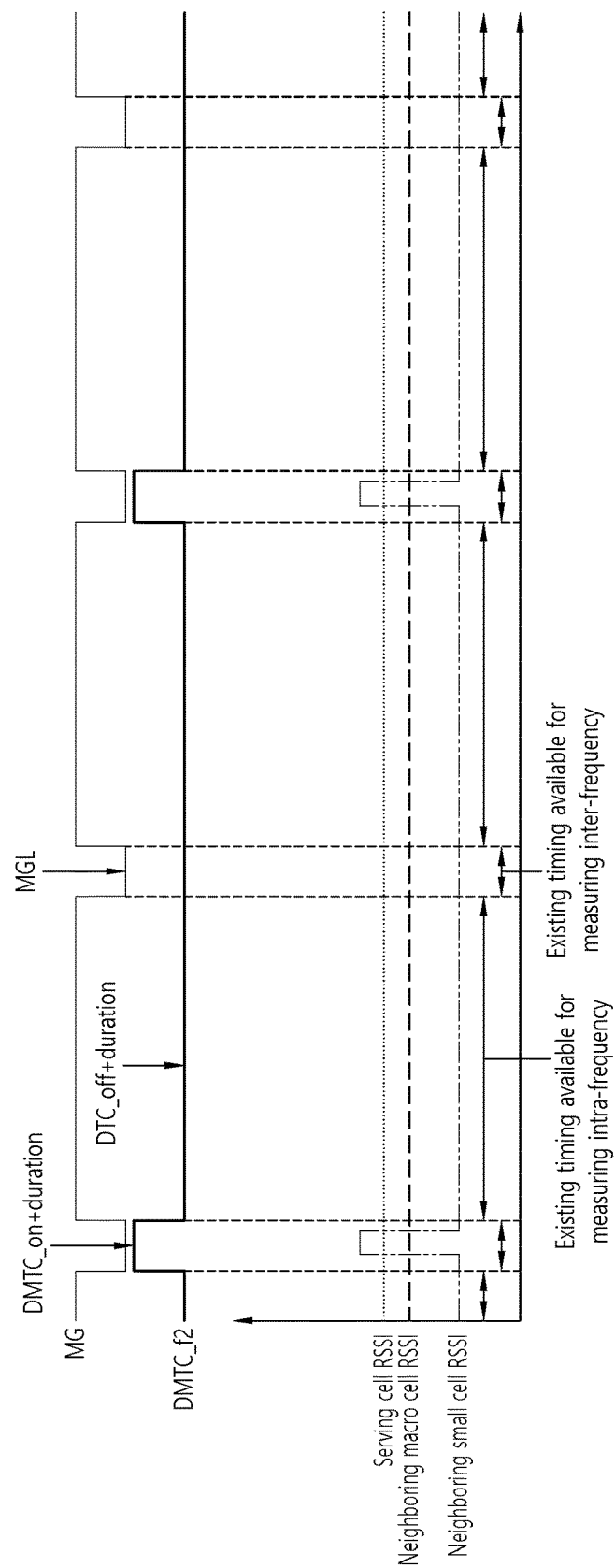

FIG. 17a illustrates an example that all of a serving macro cell, a neighboring macro cell and a neighboring small cell operate in different frequencies, and FIG. 17b illustrates the measurements of the example shown in FIG. 17a.

Referring to FIG. 17a, the serving macro cell operates in the same frequency f1, the neighboring macro cell operates in the same frequency f3, and the neighboring small cell operates in the same frequency f2.

FIG. 17b illustrates the result for a UE 100 to measure an RSSI in the case that both of the serving macro cell and the neighboring macro cell transmit a downlink signal with the same transmission power, and the neighboring small cell is turned off in the situation described above.

Owing to the neighboring small cell, the UE receives a DMTC from the serving macro cell. In this case, assuming that the neighboring small cell is off state, the UE may receive a DS from the neighboring small cell only in the DMTC duration. In the case that the frequency band in which the neighboring small cell operates is different from the frequency band in which the serving macro cell operates, in order for the UE to identify the neighboring small cell and to measure the RSRP and the RSRQ, the serving macro cell should configure such that the MGL of the MG is overlapped with the DMTC. The ratio of the overlap may be changed depending on each period.

The combination of the MG period and the DMTC period is as follows. Here, the serving cell should configure the combination that enables to identify and to measure the neighboring macro cell. (O) represents an available combination below and (X) represents impossible combination.

a) In the case that the MG period and the DMTC period are 40 ms:40 ms, (X)—It is impossible to detect and measure the neighboring macro cell f3, and it is always available to identify and measure only the neighboring small cell f2.

b) In the case that the MG period and the DMTC period are 40 ms:80 ms, (O)—It is available to identify and measure the neighboring macro cell f3 in the MGL which is not overlapped with the DMTC.

c) In the case that the MG period and the DMTC period are 40 ms:1600 ms, (O)—It is available to identify and measure the neighboring cell f3 in the MGL which is not overlapped with the DMTC.

d) In the case that the MG period and the DMTC period are 80 ms:40 ms, (X)—It is impossible.

e) In the case that the MG period and the DMTC period are 80 ms:80 ms, (X)—It is impossible to detect and measure the neighboring macro cell 13, and it is always available to identify and measure only the neighboring small cell f2.

f) In the case that the MG period and the DMTC period are 80 ms:160 ms, (O)—It is available to identify and measure the neighboring macro cell f3 in the MGL which is not overlapped with the DMTC.

That is, in the case that there is a single neighboring small cell frequency, f2 (there is one DMTC), and the neighboring macro cell f3 uses different frequency from the serving macro cell f1, the serving macro cell should configure that the DMTC period is greater than the MG period. This is applied to the UE that requires the MG.

As shown in FIG. 17b, what are measured in the MGL overlapped with the DMTC duration are the RSRP and the RSRQ for the neighboring macro cell and the RSRP and the RSRQ for the neighboring small cell. Those are measured in the MGL not overlapped with the DMTC duration are the RSRP and the RSRQ for the neighboring macro cell. The RSRP and the RSRQ for the neighboring small cell are measured only in the MGL overlapped with the DMTC duration. The RSRP and the RSRQ for the serving cell are measured in the duration except the MGL.

Here, the RSRP and the RSRQ for the neighboring macro cell are the same in both of the MGL overlapped with the DMTC duration and the MGL not overlapped with the DMTC. This is because the RSSI is defined for each frequency in the case of the inter-frequency measurement.

Figure 18A:
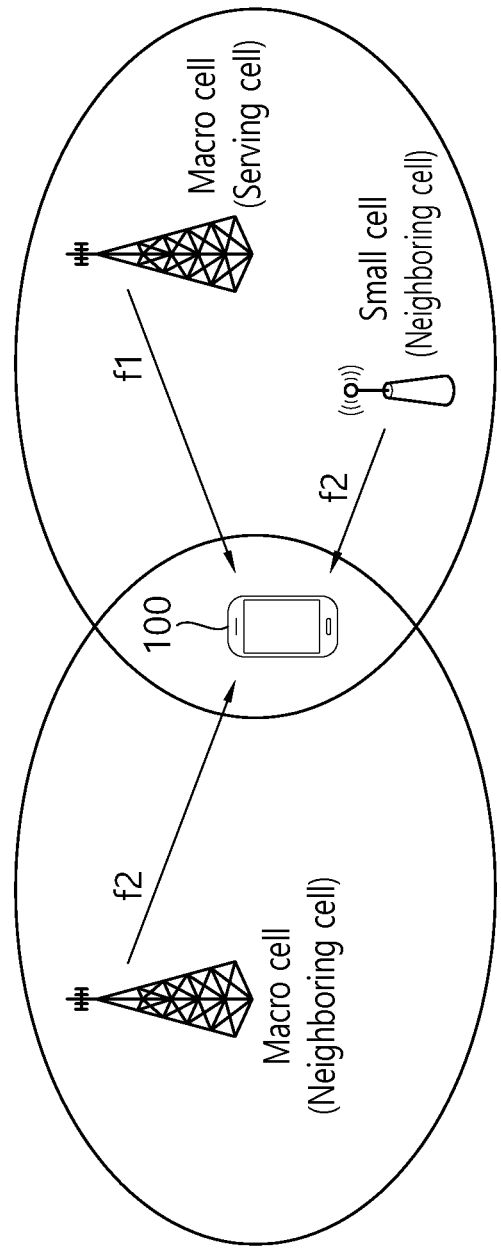
FIG. 18a illustrates an example that a neighboring macro cell and a neighboring small cell operate in the same frequency, but a serving macro cell operates in different frequency.
Figure 18B:
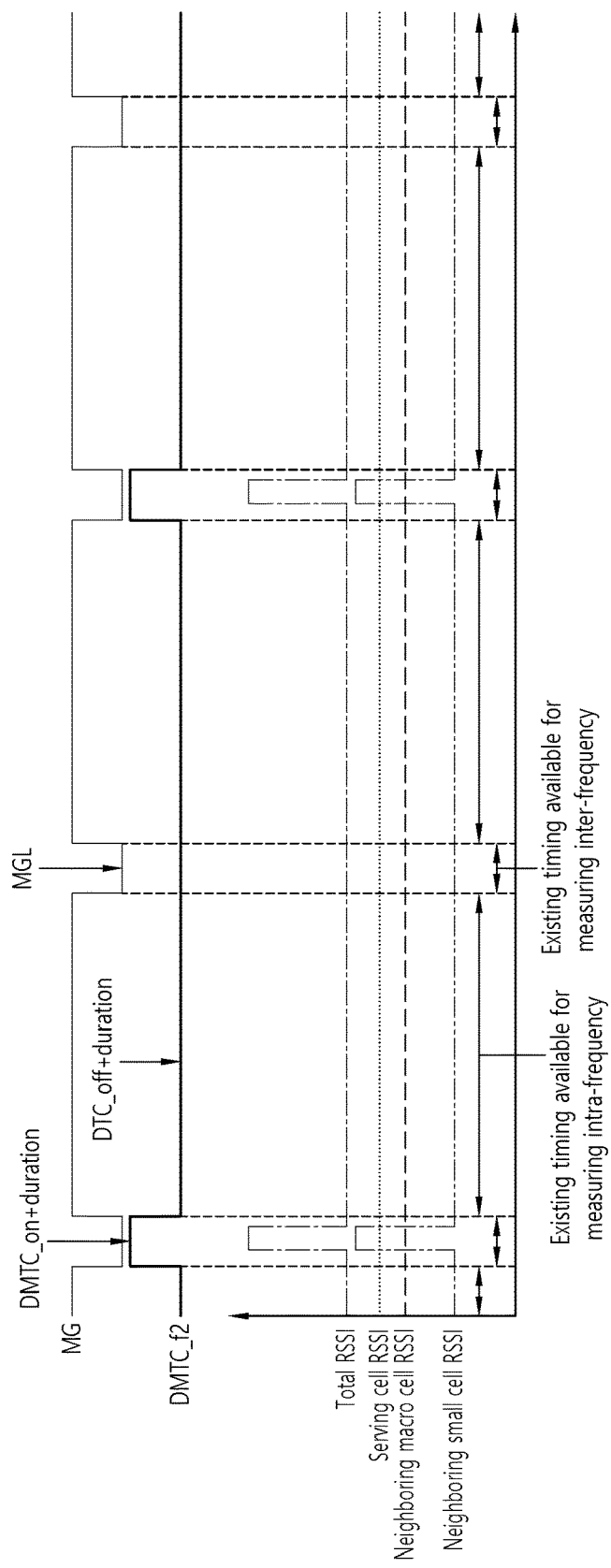

FIG. 18a illustrates an example that a neighboring macro cell and a neighboring small cell operate in the same frequency, but a serving macro cell operates in different frequency, and FIG. 18b illustrates the measurements of the example shown in FIG. 18a.

Referring to FIG. 18a, the serving macro cell operates in frequency f1, and the neighboring macro cell and the neighboring small cell operate in frequency f2.

FIG. 18b illustrates the result for a UE 100 to measure an RSSI in the case that both of the serving macro cell and the neighboring macro cell transmit a downlink signal with the same transmission power, and the neighboring small cell is turned off in the situation described above.

Owing to the neighboring small cell, the UE receives a DMTC from the serving macro cell. In this case, assuming that the neighboring small cell is off state, the UE may receive a DS from the neighboring small cell only in the DMTC duration. In the case that the frequency band in which the neighboring small cell operates is different from the frequency band in which the serving macro cell operates, in order for the UE to identify the neighboring small cell and to measure the RSRP and the RSRQ, the serving macro cell should configure such that the MGL of the MG is overlapped with the DMTC. The ratio of the overlap may be changed depending on each period.

The combination of the MG period and the DMTC period is as follows. Here, the serving cell should configure the combination that enables to identify and to measure the neighboring macro cell. (O) represents an available combination below and (X) represents impossible combination.

a) In the case that the MG period and the DMTC period are 40 ms:40 ms, (X)—It is impossible to identify and measure the neighboring macro cell f2, and it is always available to identify and measure only the neighboring small cell f2.

b) In the case that the MG period and the DMTC period are 40 ms:80 ms, (O)—It is available to identify and measure the neighboring macro cell f2 in the MGL which is not overlapped with the DMTC.

c) In the case that the MG period and the DMTC period are 40 ms:1600 ms, (O)—It is available to identify and measure the neighboring cell f2 in the MGL which is not overlapped with the DMTC.

d) In the case that the MG period and the DMTC period are 80 ms:40 ms, (X)—It is impossible.

e) In the case that the MG period and the DMTC period are 80 ms:80 ms, (X)—It is impossible to detect and measure the neighboring macro cell f2, and it is always available to identify and measure only the neighboring small cell f2.

f) In the case that the MG period and the DMTC period are 80 ms:160 ms, (O)—It is available to identify and measure the neighboring macro cell f2 in the MGL which is not overlapped with the DMTC.

That is, in the case that there is a single neighboring small cell frequency, f2 (there is one DMTC), and the neighboring macro cell f2 uses different frequency from the serving macro cell f1, the serving macro cell should configure that the DMTC period is greater than the MG period. This is applied to the UE that requires the MG.

As shown in FIG. 18b, what are measured in the MGL overlapped with the DMTC duration are the RSRP and the RSRQ for the neighboring macro cell and the RSRP and the RSRQ for the neighboring small cell. What are measured in the MGL not overlapped with the DMTC duration are the RSRP and the RSRQ for the neighboring macro cell. The RSRP and the RSRQ for the neighboring small cell are measured only in the MGL overlapped with the DMTC duration. The RSRP and the RSRQ for the serving cell are measured in the duration except the MGL. Here, the RSRP and the RSRQ for the neighboring macro cell are the same in both of the MGL overlapped with the DMTC duration and the MGL not overlapped with the DMTC. This is because the RSSI measured for the neighboring small cell is included in the RSSI measured for the neighboring macro cell in the DMTC duration. The RSRQ for the neighboring macro cell in the MGL duration overlapped with the DMTC duration is measured smaller than the RSRQ for the neighboring macro cell in the MGL duration not overlapped with the DMTC duration. In this case, the UE performs the measurement for the neighboring macro cell in the MGL (the duration overlapped with the DMTC is not distinguished from the duration not overlapped with the DMTC), the efficiency of the UE mobility becomes decreased.

Accordingly, in order to make the mobility of the UE efficiently, the UE may operate as follows.

1) The UE is required to measure and report the RSRQ by distinguishing the DMTC duration overlapped with the MGL and the DMTC duration not overlapped with the MGL. As such, it may be considered that the serving cell forwards signaling to the UE such that the UE measures and reports the RSRQ of the neighboring cell that operates in different frequency band from the frequency band of the serving cell in the above durations, respectively. When the UE receives the DMTC for the neighboring small cell and further receives the signaling, the UE measures and reports the RSRQ of the neighboring cell that operates in different frequency band from the frequency band of the serving cell in the DMTC duration overlapped with the MGL and the DMTC duration not overlapped with the MGL, respectively. This operation may also be performed even in the case that the neighboring small cell is on state. However, in this case, there is a disadvantage that the number of measuring and reporting the RSRQ of the neighboring cell increases twice.

Meanwhile, in the case that the UE has a capability of detecting and measuring the neighboring cell that operates in different frequency band from the frequency band of the serving cell although the MG is not configured, when the UE receives the configuration (including DRS occasion) of the DMTC for the neighboring small cell, the UE measures and reports the RSRQ in the DMTC duration and the duration except the DMTC duration, respectively, thereby increasing the efficiency of the UE mobility. However, in this case, there is a disadvantage that the number of measuring and reporting the RSRQ of the neighboring cell increases twice.

2) Meanwhile, the UE may measure and report the RSRQ for the neighboring cell only in the DMTC duration not overlapped with the MGL. For this, the serving cell is required to forward new signaling to the UE. Such signaling is to distinguish it from the existing operation. In this case, there is an advantage that the number of the RSRQs of the serving cell and the neighboring cell reported by the UE is the same as the existing operation.

3) In the case that the UE measures and reports the RSRQ for the serving cell and the neighboring cell without distinguishing the DMTC duration overlapped with the MGL and the DMTC duration not overlapped with the MGL as the same as the existing operation, the serving cell may use the RSRP reported from the UE, but not use the RSRQ.

Figure 19:
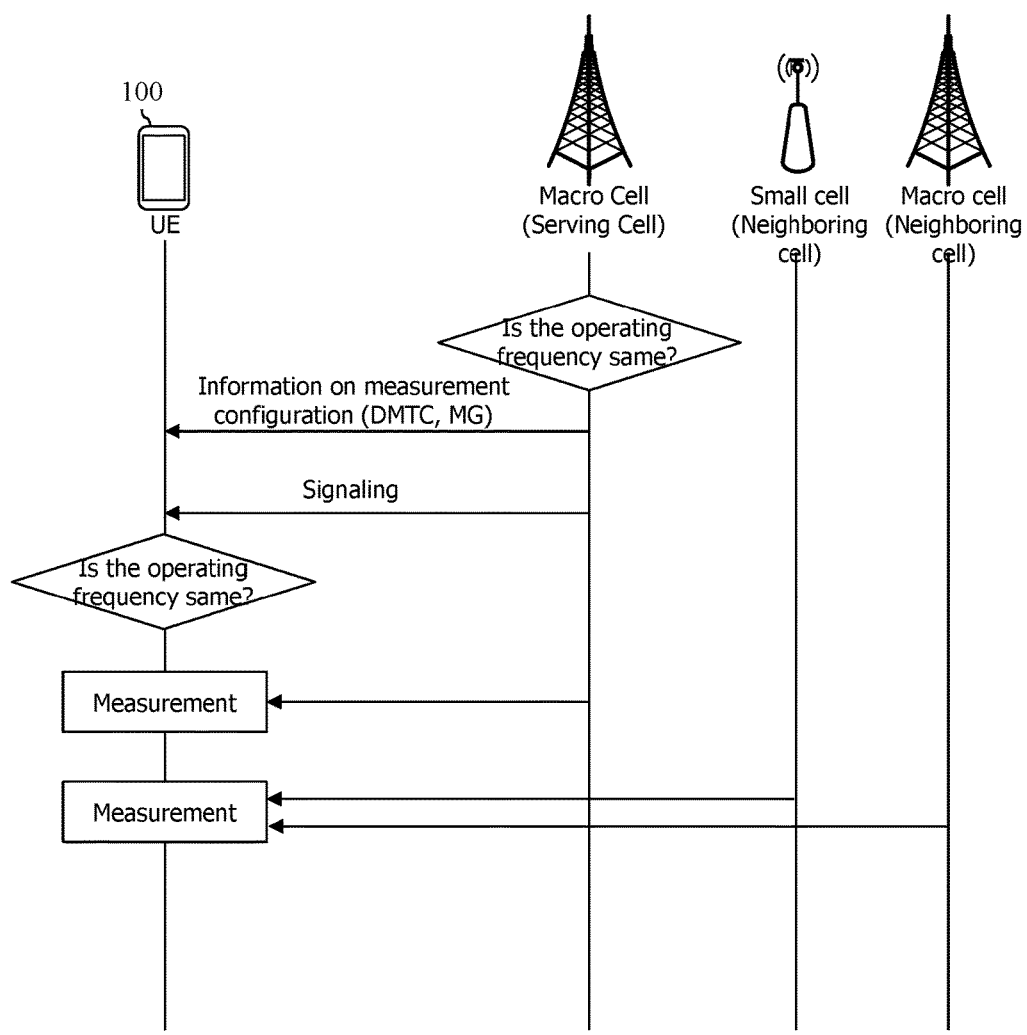
FIG. 19 is a signal flowchart illustrating an arrangement of a disclosure of the present specification.

FIG. 19 is a signal flowchart illustrating an arrangement of a disclosure of the present specification.

Referring to FIG. 19, a serving cell of a UE is a macro cell. A neighboring cell includes a small cell and a macro cell.

A serving cell determines that all of frequency band in which the serving cell itself operates, frequency band in which the neighboring cell operates and frequency band in which the neighboring small cell operates.

According to it, the serving cell forwards the measurement configuration information that includes the DMTC and the MG to the UE.

And, the serving cell may operate in one of I to III cases below.

I. The serving cell may provide signaling such that the UE may measure and report the RSRQ in the DMTC duration and the duration except the DMTC, respectively.

When, the UE receives the DMTC and the signaling:

a) In the case that the frequency band in which the serving cell operates is the same as the frequency band in which the neighboring small cell operates, a-1) In the case that the MG is not configured, The UE measures and reports the RSRQ for the serving cell and the RSRQ for the neighboring macro cell that operates in the same frequency band as the serving cell in the DMTC duration and the duration except the DMTC, respectively. In this case, the UE measures and reports the RSRQ for the small cell in the DMTC duration.

a-2) In the case that the MG is configured,

The UE measures and reports the RSRQ for the serving cell and the RSRQ for the neighboring macro cell that operates in the same frequency band as the serving cell in the DMTC duration within the duration except the MG and the duration except the DMTC, respectively. In this case, the UE measures and reports the RSRQ for the small cell in the DMTC duration.

b) In the case that the frequency band in which the serving cell operates is different from the frequency band in which the neighboring small cell operates, b-1) In the case that the MG is not configured, In the case that the frequency band in which the neighboring macro cell operates is the same as the frequency band in which the neighboring small cell operates, the UE measures and reports the RSRQ for the neighboring macro cell in the DMTC duration and the duration except the DMTC, respectively. In this case, the UE measures and reports the RSRQ for the neighboring small cell in the DMTC duration.

b-2) In the case that the MG is configured, in the case that the frequency band in which the neighboring macro cell operates is the same as the frequency band in which the neighboring small cell operates, the UE measures and reports the RSRQ for the neighboring macro cell in the duration of MGL overlapped with the DMTC and the MGL not overlapped with the DMTC, respectively. In this case, the UE measures and reports the RSRQ for the neighboring small cell in the MGL overlapped with DMTC.

II. It is proposed that the serving cell provides signaling such that the UE may measure and report the RSRQ in the duration except the DMTC separately.

When, the UE receives the DMTC and the signaling from the serving cell:

a) In the case that the frequency band in which the serving cell operates is the same as the frequency band in which the neighboring small cell operates, a-1) In the case that the MG is not configured, The UE measures and reports the RSRQ for the serving cell and the RSRQ for the neighboring macro cell that operates in the same frequency band as the frequency band in which the serving cell operates in the duration except the DMTC, respectively. In this case, the UE measures and reports the RSRQ for the small cell in the DMTC duration.

a-2) In the case that the MG is configured,

The UE measures and reports the RSRQ for the serving cell and the RSRQ for the neighboring macro cell that operates in the same frequency band as the frequency band in which the serving cell operates in the duration except the DMTC within the duration except the MG, respectively. In this case, the UE measures and reports the RSRQ for the small cell in the DMTC duration.

b) In the case that the frequency band in which the serving cell operates is different from the frequency band in which the neighboring small cell operates, b-1) In the case that the MG is not configured, In the case that the frequency band in which the neighboring macro cell operates is the same as the frequency band in which the neighboring small cell operates, the UE measures and reports the RSRQ for the neighboring macro cell in the duration except the DMTC. In this case, the UE measures and reports the RSRQ for the neighboring small cell in the DMTC duration.

b-2) In the case that the MG is configured, in the case that the frequency band in which the neighboring macro cell operates is the same as the frequency band in which the neighboring small cell operates, the UE measures and reports the RSRQ for the neighboring macro cell in the MGL duration not overlapped with the DMTC. In this case, the UE measures and reports the RSRQ for the neighboring small cell in the MGL overlapped with DMTC.

III. Meanwhile, in the case that the UE measures and report the RSRQ without distinguishing the DMTC duration and the duration except the DMTC, The serving cell may use only the RSRP for the mobility management, and may not use the RSRQ. In this case, new signaling is not required.

IV. On the other hand, in the case that the serving cell configures the MG, the serving cell configures the DMTC such that the DMTC period is greater than the MG period always in order for the serving cell to identify and measure the neighboring cell. In this case, in the case that the frequency band in which the serving cell operates is the same as the frequency band in which the neighboring small cell operates, the serving cell may configure that the DMTC and the MG are not overlapped by considering another neighboring cell that operates in the different frequency band from the frequency band in which the serving cell operates.

The embodiments of the present invention described so far may be implemented through various means. For example, the embodiments of the present invention may be implemented by hardware, firmware, software or the combination thereof. Particularly, this will be described by reference to drawing.

Figure 20:
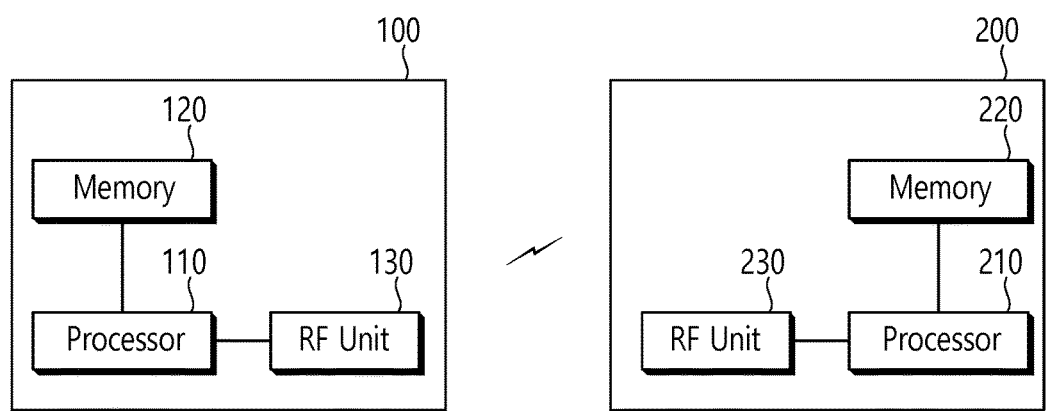
FIG. 20 is a block diagram illustrating a wireless communication system in which a disclosure of the present specification is implemented.

FIG. 20 is a block diagram illustrating a wireless communication system in which a disclosure of the present specification is implemented.

ABS 200 includes a processor 201, a memory 202, and an RF (radio frequency) unit (the MTC apparatus) 203. The memory 202 which is coupled to the processor 201 stores a variety of information for driving the processor 201. The RF unit 203 which is coupled to the processor 201 transmits and/or receives a radio signal. The processor 201 implements the proposed functions, procedure, and/or methods. In the embodiments described above, the operation of BS may be implemented by the processor 201.

A UE 100 includes a processor 101, a memory 102, and an RF (radio frequency) unit 103. The memory 102 which is coupled to the processor 101 stores a variety of information for driving the processor 101. The RF unit 103 which is coupled to the processor 101 transmits and/or receives a radio signal. The processor 101 implements the proposed functions, procedure, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for measuring a neighboring small cell, the method comprising:
   receiving, by a User Equipment (UE), measurement configuration information from a serving cell;
   setting, by the UE, a plurality of time durations to be used for measurement based on the measurement configuration information and a relationship among a first frequency band, a second frequency band and a third frequency band,
   wherein the first frequency band includes a frequency band in which the serving cell operates, the second frequency band includes a frequency band in which a neighboring macro cell operates, and the third frequency band includes a frequency band in which the neighboring small cell operates;
   performing, by the UE, a measurement for the serving cell, the neighboring small cell and the neighboring macro cell based on the plurality of time durations; and
   reporting, by the UE, a result of the performed measurement to the serving cell,
   wherein the measurement configuration information includes one or more of a Discovery signal Measurement Timing Configuration (DMTC) for the neighboring small cell and a Measurement Gap (MG),
   wherein the DMTC includes DMTC period information and information of an occasion duration of a discovery signal, and
   wherein when the first frequency band, the second frequency band, and the third frequency band are same, the measurement for the neighboring small cell is performed, by the UE, during a time duration indicated by the DMTC and the measurement for the serving cell is performed, by the UE, during a time duration except for the time duration indicated by the DMTC.

2. The method of claim 1, further comprising:
   when the first frequency band, the second frequency band and the third frequency band are the same, receiving, by the UE, signaling instructing to perform the measurement during the time duration indicated by the DMTC and a duration except for the time duration indicated by the DMTC, respectively.

3. The method of claim 1, wherein when all of the first frequency band, the second frequency band and the third frequency band are different from each other, the measurement for the neighboring small cell is performed during a duration in which the time duration indicated by the DMTC and a time duration indicated by the MG overlap, and the measurement for the neighboring macro cell is performed during a duration in which the time duration indicated by the MG does with the time duration indicated by the DMTC.

4. The method of claim 1, wherein when all of the first frequency band, the second frequency band and the third frequency band are different from each other, a period of the DMTC has a greater value than a period of the MG.

5. The method claim 1, further comprising:
   when the second frequency band and the third frequency band are the same, and the second frequency band and the third frequency band are different from the first frequency band, receiving, by the UE, signaling instructing to perform the measurement during a time duration except for the time duration indicated by the DMTC.

6. The method of claim 1, wherein when the second frequency band and the third frequency band are the same, and the second frequency band and the third frequency band are different from the first frequency band, the measurement for the neighboring small cell is performed during a duration in which the time duration indicated by the DMTC and a time duration indicated by the MG overlap, and the measurement for the neighboring macro cell is performed during a duration in which the time duration indicated by the MG does not overlap with the time duration indicated by the DMTC.

7. The method of claim 1, wherein the discovery signal includes one or a combination of a Primary Synchronization Signal (PSS), a Secondary Synchronization Signal (SSS), a Cell-specific Reference Signal (CRS) and a Channel State Information Reference Signal (CSI-RS).

8. A user equipment for measuring a neighboring small cell, the user equipment comprising:
a transceiver; and
a processor operatively coupled to the transceiver and configured to:
control the transceiver to receive a measurement configuration information from a serving cell,
set a plurality of time durations to be used for measurement based on the measurement configuration information and a relationship among a first frequency band, a second frequency band and a third frequency band,
wherein the first frequency band includes a frequency band in which the serving cell operates, the second frequency band includes a frequency band in which a neighboring macro cell operates, and the third frequency band includes a frequency band in which the neighboring small cell operates,
perform a measurement for the serving cell, the neighboring small cell and the neighboring macro cell based on the plurality of time durations, and
report a result of the performed measurement to the serving cell,
wherein the measurement configuration information includes one or more of a Discovery Signal Measurement Timing Configuration (DMTC) for the neighboring small cell and a Measurement Gap (MG),
wherein the DMTC includes DMTC period information and information of an occasion duration of a discovery signal, and
wherein when the first frequency band, the second frequency band, and the third frequency band are same, the measurement for the neighboring small cell is performed during a time duration indicated by the DMTC and the measurement for the serving cell is performed during a time duration except for the time duration indicated by the DMTC.

9. The user equipment of claim 8, wherein when all of the first frequency band, the second frequency band, and the third frequency band are different from each other, the measurement for the neighboring small cell is performed during a duration in which the time duration indicated by the DMTC and a time duration indicated by the MG overlap, and the measurement for the neighboring macro cell is performed during a duration in which the time duration indicated by the MG does not overlap with the time duration indicated by the DMTC.

10. The user equipment of claim 8, wherein when the second frequency band and the third frequency band are the same, and the second frequency band and the third frequency band are different from the first frequency band, the measurement for the neighboring small cell is performed during a duration in which the time duration indicated by the DMTC and a time duration indicated by the MG overlap, and the measurement for the neighboring macro cell is performed during a duration in which the time duration indicated by the MG does not overlap with the time duration indicated by the DMTC.

11. The user equipment of claim 8, wherein the processor is further configured to:
when the first frequency band, the second frequency band and the third frequency band are the same, control the transceiver to receive signaling instructing to perform the measurement during the time duration indicated by the DMTC and a time duration except for the time duration indicated by the DMTC, respectively.

12. The user equipment of claim 8, wherein when all of the first frequency band, the second frequency band and the third frequency band are different from each other, a period of the DMTC has a greater value than a period of the MG.

13. The user equipment of claim 8, wherein when the second frequency band and the third frequency band are the same, and the second frequency band and the third frequency band are different from the first frequency band, control the transceiver to receive signaling instructing to perform the measurement during a time duration except for the time duration indicated by the DMTC.

14. The user equipment of claim 8, wherein the discovery signal includes one or a combination of a Primary Synchronization Signal (PSS), a Secondary Synchronization Signal (SSS), a Cell-specific Reference Signal (CRS) and a Channel State Information Reference Signal (CSI-RS).

* * * * *